US012715421B2

(12) United States Patent
Havens et al.

(10) Patent No.: US 12,715,421 B2
(45) Date of Patent: Aug. 25, 2026

(54) HAUL TRUCK WITH MODULAR DRIVE SYSTEM

(71) Applicant: FLANDERS ELECTRIC MOTOR SERVICE, LLC, Evansville, IN (US)

(72) Inventors: Brian Curtis Havens, Columbia, SC (US); Michael Gordon Onsager, Franklin, WI (US); Benjamin Alex Balbach, Evansville, IN (US); Miles Christopher Griggs, Evansville, IN (US)

(73) Assignee: FLANDERS ELECTRIC MOTOR SERVICE, LLC, Evansville, IN (US)

(*) Notice: Subject to any disclaimer, the term of this patent is extended or adjusted under 35 U.S.C. 154(b) by 232 days.

(21) Appl. No.: 18/626,243

(22) Filed: Apr. 3, 2024

(65) Prior Publication Data

US 2024/0336252 A1 Oct. 10, 2024

Related U.S. Application Data

(60) Provisional application No. 63/494,229, filed on Apr. 4, 2023, provisional application No. 63/494,230, filed on Apr. 4, 2023.

(51) Int. Cl.
*B60W 20/10* (2016.01)
*B60K 1/00* (2006.01)
(Continued)

(52) U.S. Cl.
CPC ............... *B60W 20/10* (2013.01); *B60K 1/00* (2013.01); *B60K 1/02* (2013.01); *B60K 1/04* (2013.01);
(Continued)

(58) Field of Classification Search
CPC ...... B60W 20/10; B60W 10/06; B60W 10/08; B60W 10/26; B60W 10/30;
(Continued)

(56) References Cited

U.S. PATENT DOCUMENTS 10,384,560 B2 * 8/2019 Healy .................. B60K 17/356
10,723,211 B2 * 7/2020 Mastrandrea ............ B60K 1/02
(Continued)

FOREIGN PATENT DOCUMENTS

CA 3170951 A 12/2022
WO 2005119895 A1 12/2005

OTHER PUBLICATIONS

International Preliminary Report on Patentability for related application PCT/US2024/023135, mail on Oct. 2, 2025, 20 pages.

*Primary Examiner* — Edwin A Young
(74) *Attorney, Agent, or Firm* — Lathrop GPM LLP

(57) ABSTRACT

A vehicle including a chassis and an engine connected to the chassis. The vehicle also includes an alternator connected to the engine and a drive system connected to the alternator. The vehicle also includes a number of wheel motors connected to the drive system. The vehicle also includes a number of wheels connected to the wheel motors. The drive system includes a number of modules. Each of the modules is directly connected to at least one other module of the modules. Each of the modules is interchangeable with another of the modules. Each of the modules includes one or more switches for controlling a mode of operation of each of the modules. The one or more switches of each of the modules are set to control an electrical interface between the drive system and electrical components of the vehicle, the electrical components including at least the wheel motors.

21 Claims, 13 Drawing Sheets

(51) Int. Cl.

| | |
|---|---|
| ***B60K 1/02*** | (2006.01) |
| ***B60K 1/04*** | (2019.01) |
| ***B60K 11/02*** | (2006.01) |
| ***B60K 25/00*** | (2006.01) |
| ***B60L 5/20*** | (2006.01) |
| ***B60L 7/18*** | (2006.01) |
| ***B60L 50/60*** | (2019.01) |
| ***B60W 10/06*** | (2006.01) |
| ***B60W 10/08*** | (2006.01) |
| ***B60W 10/26*** | (2006.01) |
| ***B60W 10/30*** | (2006.01) |
| ***B60W 30/18*** | (2012.01) |
| ***B62D 65/10*** | (2006.01) |

(52) U.S. Cl.

CPC .............. *B60K 11/02* (2013.01); *B60K 25/00* (2013.01); *B60L 5/20* (2013.01); *B60L 7/18* (2013.01); *B60L 50/66* (2019.02); *B60W 10/06* (2013.01); *B60W 10/08* (2013.01); *B60W 10/26* (2013.01); *B60W 10/30* (2013.01); *B60W 30/1819* (2013.01); *B62D 65/10* (2013.01); *B60K 2001/0405* (2013.01); *B60L 2200/40* (2013.01); *B60L 2210/10* (2013.01); *B60W 2300/125* (2013.01)

(58) Field of Classification Search

CPC ......... B60W 30/1819; B60W 2300/125; B60L 50/66; B60L 5/20; B60L 7/18; B60L 2200/40; B60L 2210/10; B60K 1/00; B60K 1/02; B60K 1/04; B60K 11/02; B60K 25/00; B60K 2001/0405; B62D 65/10

See application file for complete search history.

(56) References Cited

U.S. PATENT DOCUMENTS

2008/0276825 A1* 11/2008 King ........................ B60L 50/60 701/19
2013/0082045 A1 4/2013 Mazumdar
2015/0090554 A1 4/2015 Mazumdar
2015/0251564 A1* 9/2015 Bastien ..................... B60L 7/18 701/22
2022/0097676 A1 3/2022 Gesang
2022/0135158 A1* 5/2022 Lee ......................... B60L 53/80 180/58

* cited by examiner

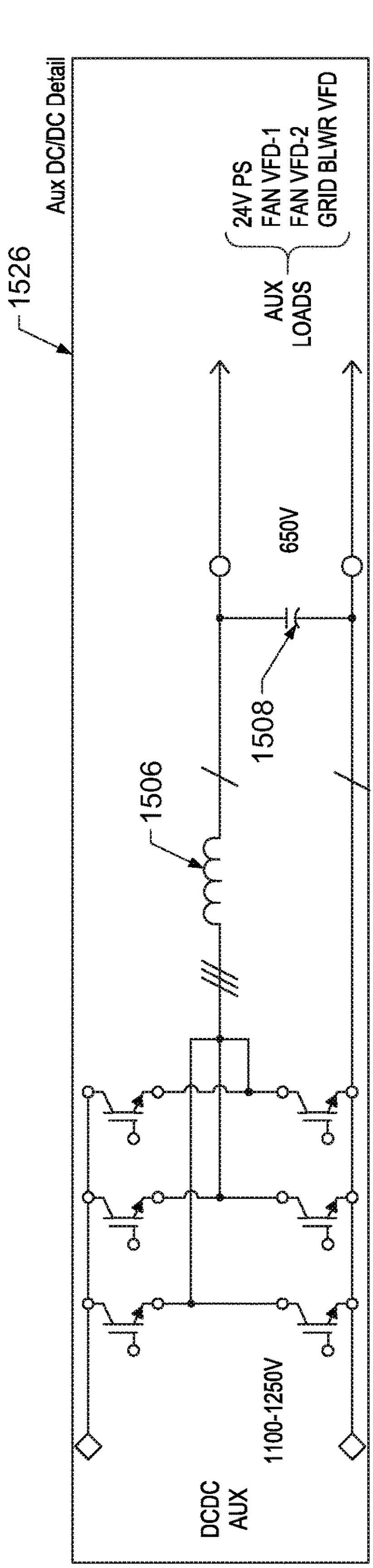
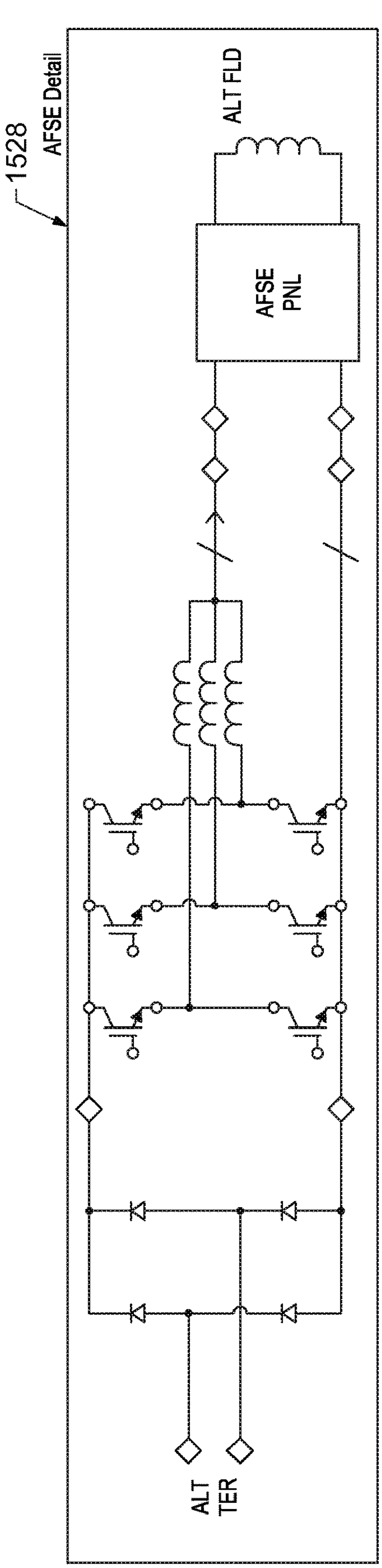
FIG. 15B

HAUL TRUCK WITH MODULAR DRIVE SYSTEM

CROSS-REFERENCE TO RELATED APPLICATIONS

This application claims priority to U.S. Provisional Patent Application No. 63/494,229, filed Apr. 4, 2023, and to U.S. Provisional Patent Application No. 63/494,230, filed Apr. 4, 2023, the entireties of which are hereby incorporated by reference.

BACKGROUND

Haul trucks are large vehicles that carry heavy loads. Haul trucks may be used during large-scale mining or construction operations. Operations that use haul trucks may have fleets of various types of haul trucks that operate around the clock. Thus, during operations, an operator may be continually servicing different haul trucks of various makes, models, and design specifications.

Haul trucks may consume an undesirable amount of fuel and produce an undesirable amount of emissions in the form of carbon dioxide, greenhouse gas, and other emissions. Therefore, it is desirable to reduce the amount of fuel consumed by a haul truck, and to reduce in other ways the haul truck's greenhouse gas emissions.

SUMMARY

One or more embodiments provide for a vehicle. The vehicle includes a chassis and an engine connected to the chassis. The vehicle also includes an alternator connected to the engine and a drive system connected to the alternator. The vehicle also includes a number of wheel motors connected to the drive system. The vehicle also includes a number of wheels connected to the wheel motors. The drive system includes a number of modules. Each of the modules is directly connected to at least one other module of the modules. Each of the modules is interchangeable with another of the modules. Each of the modules includes one or more switches for controlling a mode of operation of each of the modules. The one or more switches of each of the modules are set to control an electrical interface between the drive system and electrical components of the vehicle, the electrical components including at least the wheel motors.

One or more embodiments provide for a method of retrofitting a vehicle including a chassis, an engine connected to the chassis, an alternator connected to the engine, a transmission connected to the engine, and a number of wheels connected to the chassis. The method includes removing the transmission and connecting a drive system to the chassis and to the alternator. The method also includes connecting a number of wheel motors to the wheels and to the drive system. The drive system includes a number of modules. Each of the modules is directly connected to at least one other module of the modules. Each of the modules is interchangeable with another of the modules. Each of the modules includes one or more switches for controlling a mode of operation of each of the modules. The one or more switches of each of the modules are set to control an electrical interface between the drive system and electrical components of the vehicle, the electrical components including at least the wheel motors.

Other aspects of one or more embodiments will be apparent from the following description and the appended claims.

BRIEF DESCRIPTION OF DRAWINGS

FIG. 4, FIG. 5, FIG. 6, and FIG. 7 show examples of a modular drive system arrangements for a haul truck, in accordance with one or more embodiments.

Like elements in the various figures are denoted by like reference numerals for consistency.

DETAILED DESCRIPTION

Figure 1:
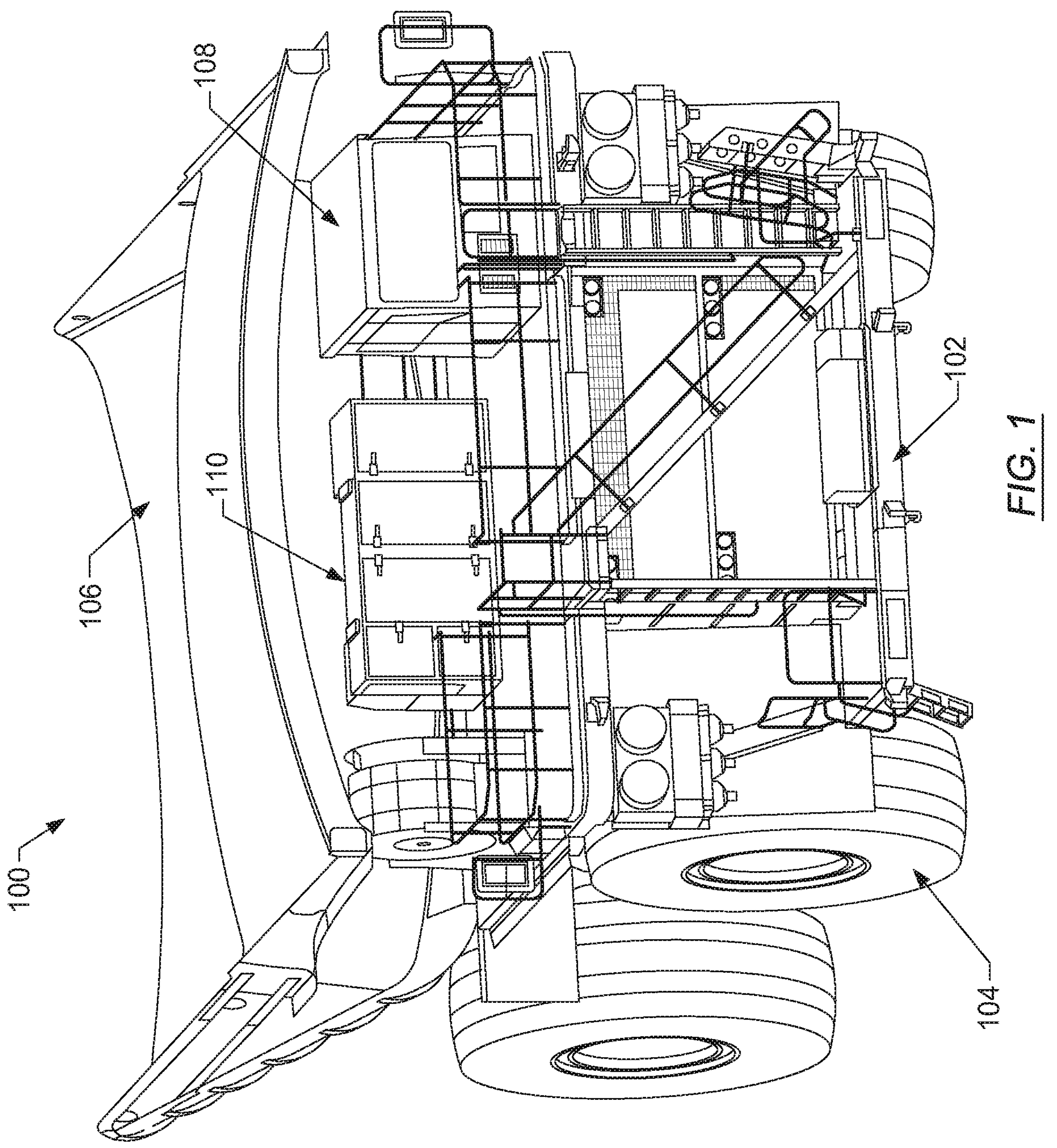
FIG. 1 shows an example of a haul truck, in accordance with one or more embodiments.

In general, embodiments are directed to haul trucks with a modular drive system that works together with a combustion engine and wheel motors to drive the truck. One or more embodiments also include methods and devices for retrofitting many different types of haul trucks to operate as haul trucks with modular drive systems. Thus, one or more embodiments relate to a type of hybrid haul trucks.

Because haul trucks are very expensive (millions of dollars for each haul truck), replacing a fleet of traditional combustion engine haul trucks with a fleet of new electric or hybrid haul trucks may be prohibitively expensive. However, retrofitting an existing combustion engine haul truck to use a hybrid or all-electric drive system has not been practical or cost effective.

Retrofitting has not been practical because of the unique design of haul trucks (long drive shaft (relative to automobiles), different locations of the drive shaft, and the transmission (relative to smaller trucks), and other factors. For example, haul trucks are subjected to extreme conditions, in terms of the forces applied to a haul truck, the electrical currents used in a hybrid or electric haul truck, and the environmental wear imposed in harsh mining or construction conditions. In a specific example, haul trucks can carry loads in excess of 240 tons and may operate exclusively off-highway in harsh conditions at low speeds, presenting conditions that may exceed the limits and capabilities of conventional motors.

For these reasons, existing combustion-driven haul trucks remain in operation and conversion to hybrid or electric haul trucks has been non-existent. However, there is a growing desire in the industry to reduce carbon emissions, in turn creating a desire to seek solutions to retrofit combustion-driven haul trucks into hybrid or electric haul trucks.

One or more embodiments address the technical challenges involved in retrofitting, in a cost effective manner, a haul truck to use a hybrid drive system. One or more embodiments provide for a modular drive system that can be used to retrofit an entire fleet of existing mixed haul truck models. The wheel motors and drive system of one or more embodiments are specifically designed to handle the large amount of torque that the haul truck drivetrain uses to carry large loads while also being small enough to fit in the available space.

In one or more embodiments, wheel motors may be connected to two or more of the wheels of the haul truck. For example, one wheel motors may be connected to wheels on a one-for-one basis, though it is possible that a wheel motor may be attached to multiple wheels that rotate in tandem. A modular drive system is installed in the haul truck. The modular drive system controls the operation of the wheel motors, which in turn drives or slowly rotates the wheels of the haul truck.

The engine of the haul truck may be retained. An alternator connected to the engine may generate electrical power, which is provided to the drive system. However, in an embodiment, physical components such as a transmission, differential, and drive shaft may be removed from the haul truck being retrofitted, as such components will no longer be necessary when the drive system and wheel motors are installed. Nevertheless, in an embodiment, the drive shaft, transmission, and differential may be retained so that the haul truck may still operate without using the wheel motors. In still another embodiment, a drive shaft motor may be installed to the engine, with the drive shaft motor connected to the transmission and differential, if use of the wheel motors is undesirable.

A battery may be installed in the haul truck. The battery may be charged by regenerative braking via one or more of the wheel motors when the haul truck is going downhill or stopping. Supplemental charging of the battery using an external power source is available if the terrain where the haul truck is operating does not have enough downhill slope to charge the battery adequately. For example, the battery may be plugged into a source of electrical power, the truck may be provided with solar panels for generating electricity for the battery, etc.

One or more embodiments also contemplates a modular haul truck that may operate with multiple power sources, such as the battery or batteries mentioned above, hydrogen fuel cells, solar cells, trolley, etc. The retrofit multi-power source truck drive system of one or more embodiments is designed to operate both mechanical diesel and diesel electric haul trucks of multiple makes and models.

The drive system of one or more embodiments may be presented as a retrofit kit that can be installed in multiple types of haul trucks to provide a modern and supported propulsion drive system. A retrofit kit allows operators to continue to utilize the investment they made in their existing fleet while moving toward a modern system represented by one or more embodiments, with support for alternative power sources to assist in fuel savings and emission reduction.

The kit of one or more embodiments can be added easily (relative to changing the chassis) to existing trucks with little to no structural changes needed and at a price that is much less than purchasing new trucks. The ease of adding the kit to trucks is accomplished by utilizing a modular structure that maximizes the re-use of existing major truck components such as the chassis, engine, alternator, etc.

The modularity of the system allows the kit of one or more embodiments to be easily configured for multiple voltages using series converters or multiple currents using parallel converters. One or more embodiments can benefit applications where running from high voltage overhead lines (i.e., a trolley arrangement) is available as an option to increase truck performance or decrease engine load for emissions purposes.

Thus, the haul trucks of one or more embodiments address the challenges described above. For example, the haul trucks of one or more embodiments have an electrical system designed (as described below) to handle much higher voltages and current than the electrical systems used in other common hybrid applications. Components of one or more embodiments may accommodate multiple power sources by way of adding modules to accommodate control of each type of power source. The components are also designed to minimize the structural changes applied to a haul truck when retrofitting an existing haul truck. For example, the drive system specifications for an existing truck may be evaluated. An arrangement of modules may be determined for the drive system specifications. The truck may then be retrofitted with whatever arrangement and programming of modules that are suitable for matching the drive system specifications for a specific existing haul truck.

One or more embodiments may use the wheel motors to increase performance of the haul truck by outputting more power than the engine can alone. One or more embodiments may use the wheel motors to allow the engine to be completely shut off while the haul truck still operates. Thus, one or more embodiments reduces fuel consumption and reduces carbon emissions by reducing the amount of time the engine is operational, while still optimizing the engine efficiency.

FIG. 1 shows an example of a haul truck, in accordance with one or more embodiments. The haul truck (100) includes a chassis (102) to which are connected wheels, such as wheel (104). Note that the chassis (102) may include many structural components of the haul truck (100), not just the single component to which reference numeral 102 points in FIG. 1.

The haul truck (100) also includes a bed (106) used for hauling loads. The haul truck (100) may include a cabin (108) where a human operator may operate the haul truck (100). The haul truck (100) further includes a drive system (110) where control modules and electronics, such as the modules and electronics shown in FIG. 4 through FIG. 15.

Figure 2:
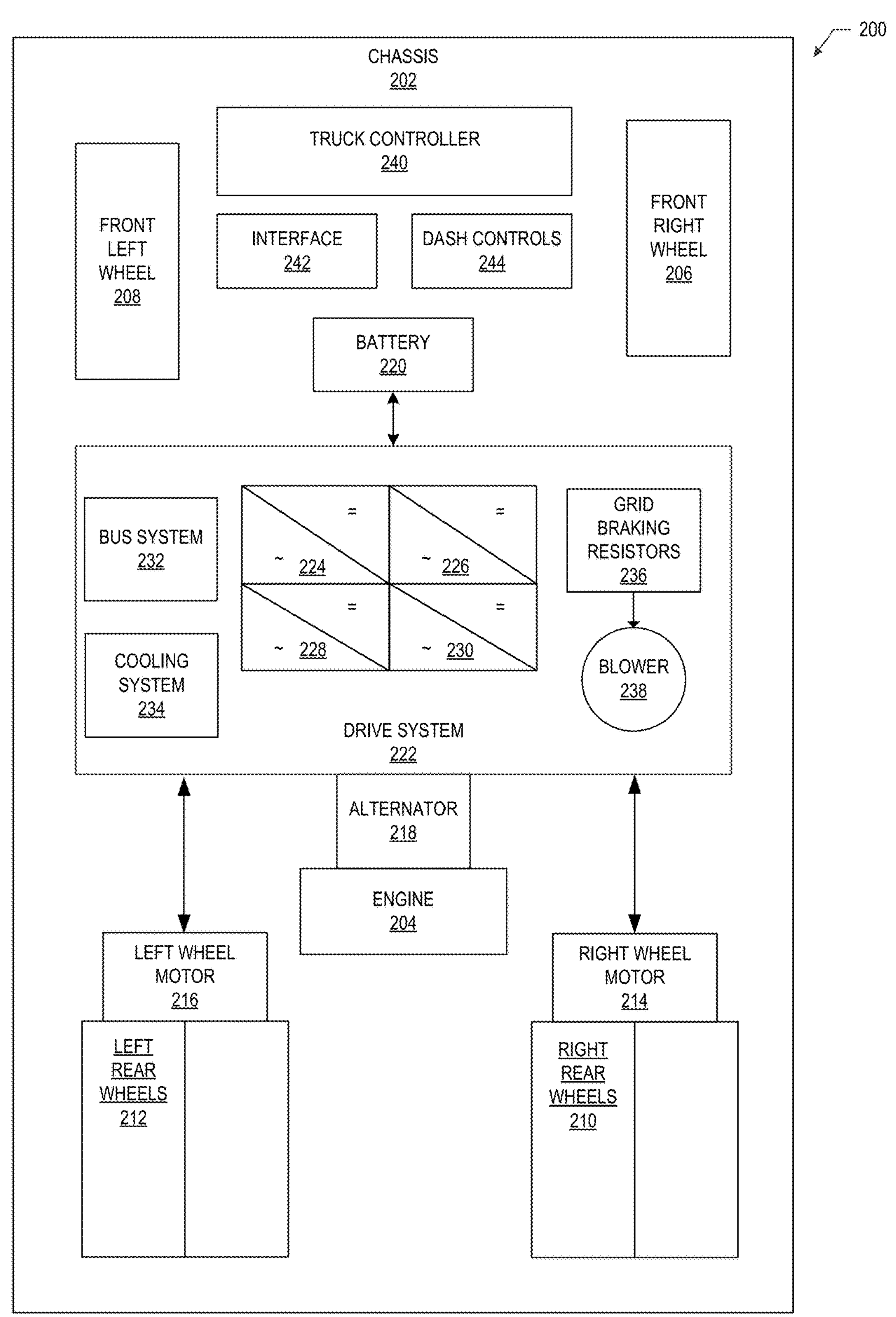
FIG. 2 shows a block representation of a haul truck having a modular drive system, in accordance with one or more embodiments.

FIG. 2 shows a block representation of a haul truck (200) having a modular drive system (222), in accordance with one or more embodiments. The haul truck (200) may be the haul truck (100) of FIG. 1. The haul truck (200) includes a chassis (202) to which is connected an engine (204). The engine (204) may be a combustion engine, though the engine (204) may be different types of engines. The engine (204) also may be a combination of multiple engines.

The haul truck (200) also has wheels connected to the chassis (202), such as the right front wheel (206), left front wheel (208), left rear wheels (212), and right rear wheels (210). More or fewer wheels may be present.

One or more wheel motors may be connected to the wheels of the haul truck (200). For example, the right wheel motor (214) is connected to the right rear wheels (210) and the left wheel motor (216) is connected to the left rear wheels (212). The wheel motors are electrical motors capable of imparting torque to the wheels. The torque imparted may be in two angular directions at different times (i.e., to spin the wheels either clockwise or counterclockwise from a selected viewpoint of the wheels).

The haul truck (200) also includes an alternator (218). The alternator (218) is a component which, when rotated using rotational energy from the engine (204), generates electricity. The alternator (218) may be a source of electrical generation in the haul truck (200), though other electrical energy sources may be present, such as solar cells, hydrogen fuel cells, a trolley conduction line, etc.

The haul truck (200) may include a battery (220) connected to the chassis (202). The battery (220) may be one or more batteries or other components for storing electrical energy, including capacitors. As an example, the battery (220) may be one or more pairs of dual batteries. For example, dual batteries may be connected to an isolated direct current to direct current converter (DC/DC converter) and an inverter. The DC/DC converter and the inverter may provide for a fully independent power system for each wheel motor.

The haul truck (100) also includes a drive system (222). The drive system (222) is one or more electrical or mechanical components used to control the wheel motors (e.g., the right wheel motor (214) and the left wheel motor (216)) and possibly other electrical systems of the haul truck (200).

The haul truck (200) includes a number of modules, such as module (224), module (226), module (228), and module (230). More or fewer modules may be present. Each module is configurable to act as a different type of electrical component in the drive system (222). The modules may be configurable, for example, as inverters, rectifiers, voltage converters (e.g., a DC/DC converter), alternator field static exciters (AFSE), and other types of electrical systems. Switches on the modules, or firmware parameters or software-adjustable parameters, may determine the individual modes of operation of the modules. As used herein, the term "switch," when used with respect to a module, contemplates any of physical switches, virtual switches, firmware parameters, or software-adjustable parameters. The modules and exemplary arrangements of the modules are shown in FIG. 4 through FIG. 14.

The exact number of modules and the programmed functionality of the modules depend on the specific haul truck that is being retrofitted or built. The number of modules and the programmed functionality of the modules also may depend on the specific mission (i.e., set of commonly assigned tasks) of the haul truck in question. Thus, one or more embodiments contemplate determining the system specifications for the haul truck in question, including any specifications for existing, non-replacement components of the haul truck to interface with the drive system (222). The number and programming of the modules is then determined. The number of modules is then installed and subsequently programmed for the haul truck. Any motors and possibly other components also may be installed.

As an example, the modules may be arranged into one or more inverter clusters. Each inverter cluster may be isolated from another inverter cluster to allow each inverter cluster to operate independently, in case of failure of any one inverter cluster. This arrangement allows a diesel-electric truck to still accelerate and decelerate in the event of failure of an inverter or a motor.

The isolation of power systems in the drive system (222) may extend beyond the inverter. For example, the DC/DC converter may be one or more clusters of modules that are isolated from each other. This arrangement permits the drive system (222) to completely disconnect power sources that could be malfunctioning. Remaining power sources could still provide power to the drive system (222). Thus, the haul truck (200) may continue to operate even in the event of failure of a power generation system (i.e., the engine, a fuel cell, etc.).

The haul truck (200) also may include a bus system (232). The bus system (232) may be part of one or more of the modules (i.e., the module (224), the module (226), the module (224), or the module (230)). The bus system (232) is wiring and other connections that provide electrical power from the drive system (222) to other components of the haul truck (200), such as the right wheel motor (214) or left wheel motor (216).

The haul truck (200) also may include a cooling system (234). The cooling system (234) is a system of coolant inlet lines and coolant outlet lines, together with one or more coolant sources. The cooling system (234) cools the drive system (222), including the modules, or other electrical components of the truck. For example, the cooling system may be extended to cool the wheel motors (e.g., the right wheel motor (214) and the left wheel motor (216)). Due to the high voltages and amperages in use during operation of the haul truck (200), excess heat may be problematic in some cases without installation of the cooling system (234). However, the cooling system (234) may be omitted in some configurations of the drive system (222), depending on the haul truck (200) specifications.

Examples of the cooling inlets and cooling outlets are shown in FIG. 4 through FIG. 14. The one or more coolant sources may be tanks or coils of coolant lines. The coolant may be a liquid or gas, such as but not limited to air, water, antifreeze, or other liquids or gasses.

The drive system (222) may include components other than the modules. For example, one or more grid braking resistors (236) may be provided in the haul truck (200). The grid braking resistors (236) may be used to dissipate the extra power produced from the wheel motor during regenerative braking that cannot be accepted by alternative power sources such as batteries.

The grid braking resistors (236) may be connected to a blower (238). The blower (238) is one or more fans powered by the drive system (222). The blower (238) may blow air over the grid braking resistors (236) or over one or more other components of the drive system (222) in order to aid in cooling components of the drive system (222).

The drive system (222) of the haul truck (200) also may include, or be connected to, one or more additional power sources. In the example of FIG. 2, a power source is the engine (204). However, the drive system (222) (or other parts of the haul truck (200)) may include alternative power sources, or additional power sources. For example, a power source for the drive system (222) may be an external high voltage cable that permits the haul truck (200) to operate as a trolley. In this case, the drive system (222) may include a trolley system that maintains an electrical connection to the high voltage cable. The bus system (232) may connect the trolley system to the drive system (222), optionally through a module configured as a DC/DC converter. Other alternative or additional power systems include hydrogen fuel cells, solar cells, and others, any of which are a part of or connected to the drive system (222).

The haul truck (200) also may include a truck controller (240). The truck controller (240) is electric components, switches, controls, etc. which an operator may use to control the haul truck (200). The truck controller (240) may control various aspects of the drive system (222). However, the functionality of the modules of the drive system (222) is controlled by the switches on the modules. Nevertheless, in some embodiments, the truck controller (240) may include functionality for commanding the switches on the modules of the drive system (222) to change in order to change a configuration of the electrical functionality of the modules.

The haul truck (200) also may include one or more interfaces, represented by interface (242). The interface (242) may be part of the truck controller (240). The interface (242) may include display devices (monitors, televisions, speakers, haptic devices, etc.) as well as user input devices (keyboards, mice, touchscreens, speakers, haptic devices, etc.). Thus, the interface (242) provides a user the ability to manipulate the truck controller (240) to control various aspects of the drive system (222) or power distribution throughout the haul truck (200).

The haul truck (200) also may include one or more dash controls (244), which may be part of the truck controller (240). The dash controls (244) are controls for operating the truck, such as to increase or decrease power to the wheel motors, to turn the truck, control the amount of electrical energy drained from or added to the battery (220), etc.

Thus, the haul truck (200) of one or more embodiments may be designed to replace the existing truck electronics and controls with modern flexible components. Furthermore, one or more embodiments permit further modification to the haul truck (200) as technology continues to evolve. For example, the modular control components may be expanded with analog or digital I/O modules and fully customizable glass dashboard displays. The drive system (222) is designed to permit adding or removing I/O as needed for updating haul trucks already having the drive system (222). Furthermore, the truck controller (240), interface (242) or dash controls (244) may be modified as decarbonization equipment is added without requiring replacement of these components.

The drive system (222) may be provided as a kit. For example, the drive system (222) may be provided as a base drive system that is configured to operate at the voltage and current level that supports the truck series that is most prevalent in the industry. The kit (i.e., the base system) then may be modified by adding or removing inverter clusters or other modules or components to support the specified currents or voltages of the wheel motors, alternator, or other components of the existing haul truck (200) being retrofitted.

Figure 3:
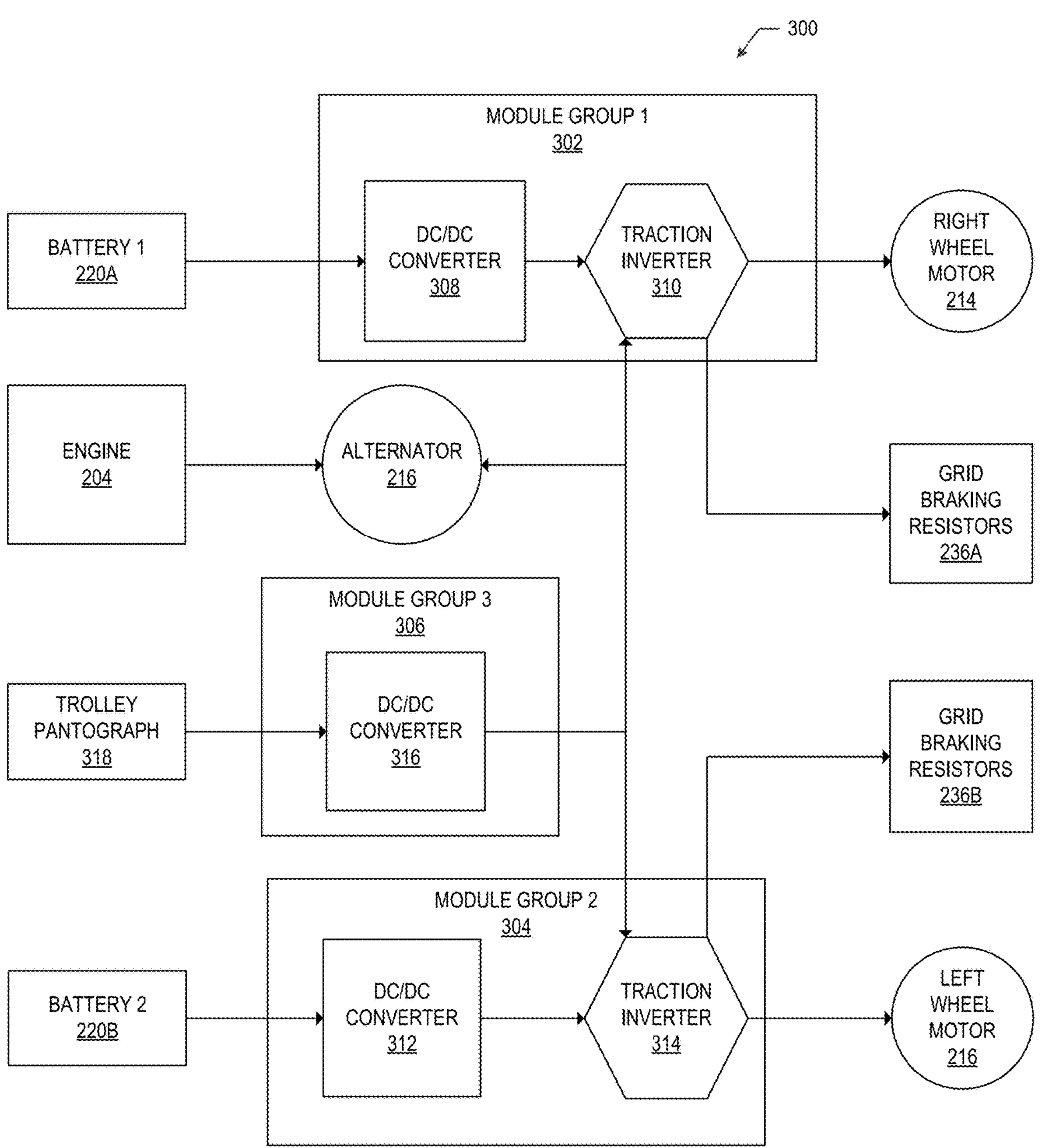
FIG. 3 shows an arrangement of connections of components for a haul truck having a modular drive system, in accordance with one or more embodiments.

FIG. 3 shows an arrangement of connections of components for a haul truck having a modular drive system, in accordance with one or more embodiments. In particular, FIG. 3 may be considered an arrangement of the connection of components in the haul truck (200) shown in FIG. 2. Thus, in FIG. 3, reference numerals in common with FIG. 2 share common definitions and descriptions. Thus, the haul truck (300) of FIG. 3 may be a specific arrangement of components for the haul truck (200) of FIG. 2.

However, the connections shown in FIG. 3 are not necessarily direct physical connections. Thus, for example, while the three module groups shown in FIG. 3 are shown as being three separate groups, it is possible to physically arrange the three groups in a cluster of modules that are all grouped into one physical cluster of modules.

The haul truck (300) of FIG. 3 includes the engine (204) and a left wheel motor (216) for electrical power generation. The haul truck (300) of FIG. 3 also includes two battery groups which form the battery (220) of FIG. 2. Specifically, the haul truck (300) includes battery 1 (220A) and battery 2 (220B).

In FIG. 3, the drive system (222) of FIG. 2 includes three groups of modules. The three groups of modules are represented, in FIG. 3, as module group 1 (302), module group 2 (304), and module group 3 (306).

Figure 15A:
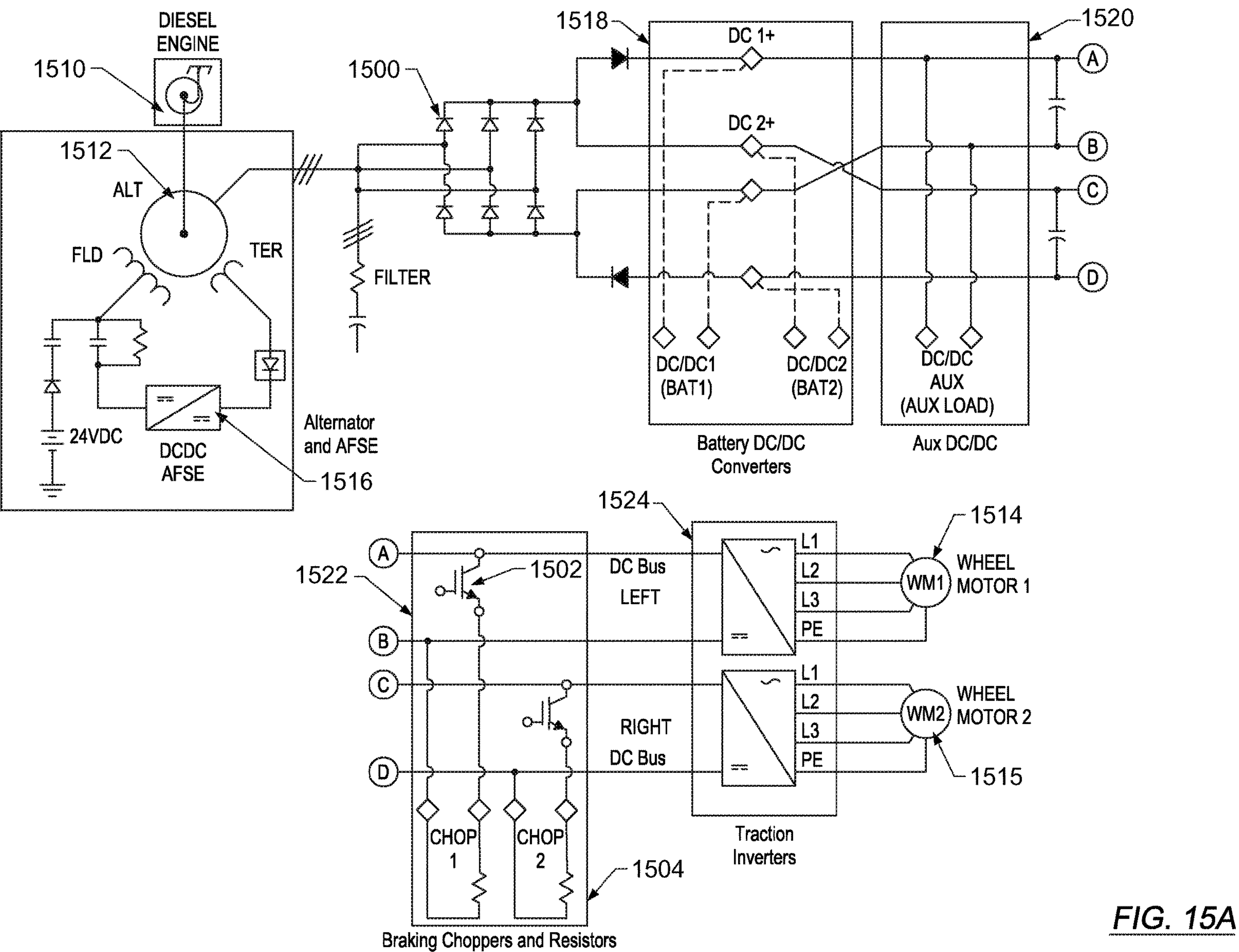
FIG. 15 shows an electrical wiring diagram for a haul truck having a modular drive system, in accordance with one or more embodiments.

The module group 1 (302) includes one or more modules that, together, act as a direct current to direct current (DC/DC) converter, or DC/DC converter (308). The DC/DC converter (308) transforms the voltage of a DC current. As used herein a "DC/DC converter" includes a transformer (i.e., an electrical circuit that transforms an electrical current at a first voltage to an electrical current at a second voltage). However, a "converter" may include one or more additional electrical circuits, of which the transformer is one electrical circuit. As an example, the section (1526) in FIG. 15 shows the details of a DC/DC converter, which includes a transformer plus additional circuitry.

The module group 1 (302) also includes one or more modules that, together, act as a traction inverter (310). The traction inverter (310) transforms a DC current to an alternating (AC) current. The word "traction" is used as an identifying term with respect to the "traction inverter." Specifically, the wheel motors without gearing may be referred to as "traction motors." Therefore, the inverters connected to the motor(s) may be referred to as a "traction inverter," as the "traction" inverter transfers power to the "traction" motors.

Thus, as a whole, the module group 1 (302) transforms the voltage of a DC current from the battery 1 (220A) and then converts the transformed DC current into an AC current. In an embodiment, the DC/DC converter (308) is one module and the traction inverter (310) is a second module.

The module group 2 (304) includes one or more modules that, together, act as another voltage converter, specifically, DC/DC converter (312). Additionally, the module group 2 (304) includes one or more modules that, together, act as another traction inverter, specifically, traction inverter (314). Thus, as a whole, the module group 2 (304) transforms the voltage of a DC current from the battery 2 (220B) and then converts the transformed DC current into an AC current. In an embodiment, the DC/DC converter (312) is one module and the traction inverter (314) is a second module.

The module group 3 (306) includes a DC/DC converter (316). The DC/DC converter (316) includes two or more modules that, together, act as a DC transformer, specifically DC/DC converter (316). The DC/DC converter (316) transforms the voltage of a DC current flowing via a trolley pantograph (318) connected to the haul truck (300). In other words, the haul truck (300) derives power from two power sources: the engine (204) and the trolley pantograph (318).

Both power sources (the engine (204) and the trolley pantograph (318)) are connected to both traction inverters (i.e., the traction inverter (310) and the traction inverter (314)). In turn, the traction inverter (310) is connected to the right wheel motor (214) and to one or more grid braking resistors (236A). The grid braking resistors (236A) are part of the grid braking resistors (236) in FIG. 2. Similarly, the traction inverter (314) is connected to the left wheel motor (216) and to the grid braking resistors (236B). The grid braking resistors (236B) is part of the grid braking resistors (236) in FIG. 2.

Thus, the three module groups shown in FIG. 3 may be used to control the power transmitted to or from the right wheel motor (214) and the left wheel motor (216). The right wheel motor (214) and the left wheel motor (216) may be independently controlled. Specifically, the module group 1 (302) may control the right wheel motor (214) and the module group 2 (304) may control the left wheel motor (216). Thus, the drive system (222) of FIG. 2 (which in FIG. 3 includes the trolley pantograph (318), the battery 1 (220A), the battery 2 (220B), the module group 1 (302), the module group 2 (304), the module group 3 (306), the grid braking resistors (236A), and the grid braking resistors (236B)) may be used to independently control the amount of torque applied to the rear wheels of the haul truck (300).

FIG. 4, FIG. 5, FIG. 6, and FIG. 7 show examples of a modular drive system arrangements for a haul truck, in accordance with one or more embodiments. Turning first to FIG. 4, FIG. 4 shows a power cabinet for use in the hybrid haul truck shown in FIG. 2 through FIG. 6, in accordance with one or more embodiments. The power cabinet (400) enclosed within a weldment (402) may be part of the drive system (222) shown in FIG. 2. The power cabinet (400) may be one or more cabinets shown in the drive system (108) of FIG. 1.

The power cabinet (400) includes two sections having components designed to perform one or more predetermined functions. Section A (404) includes one or more modules, such as the modules shown in FIG. 2. The Section A (404) also may include drive electronics and a liquid cooling system that includes a fluid pump, as described above with respect to FIG. 7 and FIG. 8. The fluid pump is configured to pump the coolant through the coolant lines. Section A (404) also includes a number of fluid lines, as described with respect to FIG. 7 and FIG. 8. In turn, section B (406) is a control section of the power cabinet (400), described further below.

Section A (404) includes a number of modules that may be arranged together. The modules may be physically identical so that one module may be replaced with another, and so that the modules may be compactly arrayed within the section A (404). The modules may be provided with switches that change their functions. However, in the alternative, one or more of the modules may be different in order to accommodate different power control functionality.

In the example of FIG. 4, the Section A (404) includes a first inverter module (408), a second inverter module (410), and a third inverter module (412). Each inverter module is programmed by the switches (or is otherwise configured) to operate as an inverter, as described elsewhere herein. Together, the inverter modules in the Section B (406) may operate as a single inverter in the drive system (222) of FIG. 2. A fourth module, a DC/DC converter module (414), is programmed to convert DC electrical power from one voltage to another, different voltage.

More or fewer modules may be provided, and the modules may be programmed to perform different electrical functions. Each module may be easily accessed and serviced by opening a door to the power cabinet (400). The modules may utilize the same hardware for ease of replacement and spare part inventory. This high voltage portion of the power cabinet (400) may be locked to prevent unauthorized outside access.

Section B (406) includes a system controller (416) and field wiring (418), which also may be part of the drive system (222) shown in FIG. 2. The drive system cabinet provides ease of access and safety. High voltage areas are isolated and locked from access. The field wiring (418) and other electronics may be behind hinged cabinet doors that can also be locked. A maintenance interface (420) may be available in the section B (406) to allow access to data logging, trends, and system analytics.

The system controller (416) in section B (406) may send commands to the drive system (222) based on operator input, motor speed, motor temperature, engine communication, transmission communication, wheel speed, haul truck inclination, and/or internal measurement units (IMU). The IMU (422) is a device that includes a combination of an accelerometer, a compass, and a gyroscope. Communication to the various system components may occur via J1434/Canbus, high speed ethernet, analog signals, or digital signals.

The system controller (416) in Section B (406) may use one or more algorithms and the data described above to determine how and when to energize the motor to achieve reduced emissions and fuel usage while maximizing battery life. A maintenance interface (420) may be available to allow access to data logging, trends, and system analytics. Wireless network connectivity may be included to allow remote monitoring, configuration, and cloud-based reporting for a fleet of haul trucks.

Section A (404) and Section B (406) also may include auxiliary components, including an alternator field static exciter (AFSE), grid blower inverter, coolant pump, and high-power field terminals. The Section B (406) also may house a main programmable logic controller (PLC) rack, data logging software and hardware, and low voltage control fuses and relays. Again, the maintenance interface (420) may be provided on the door of this cabinet section for onboard troubleshooting and data logging. The backside of the power cabinet (400) may be reserved for field connections and terminations.

The power cabinet (400) may be electrically connected to a truck controller (424). The truck controller (424) may be the truck controller (240) of FIG. 2. Thus, the various components described with respect to the power cabinet (400) may be controlled via the truck controller (424) as descried with respect to FIG. 2.

Figure 5:
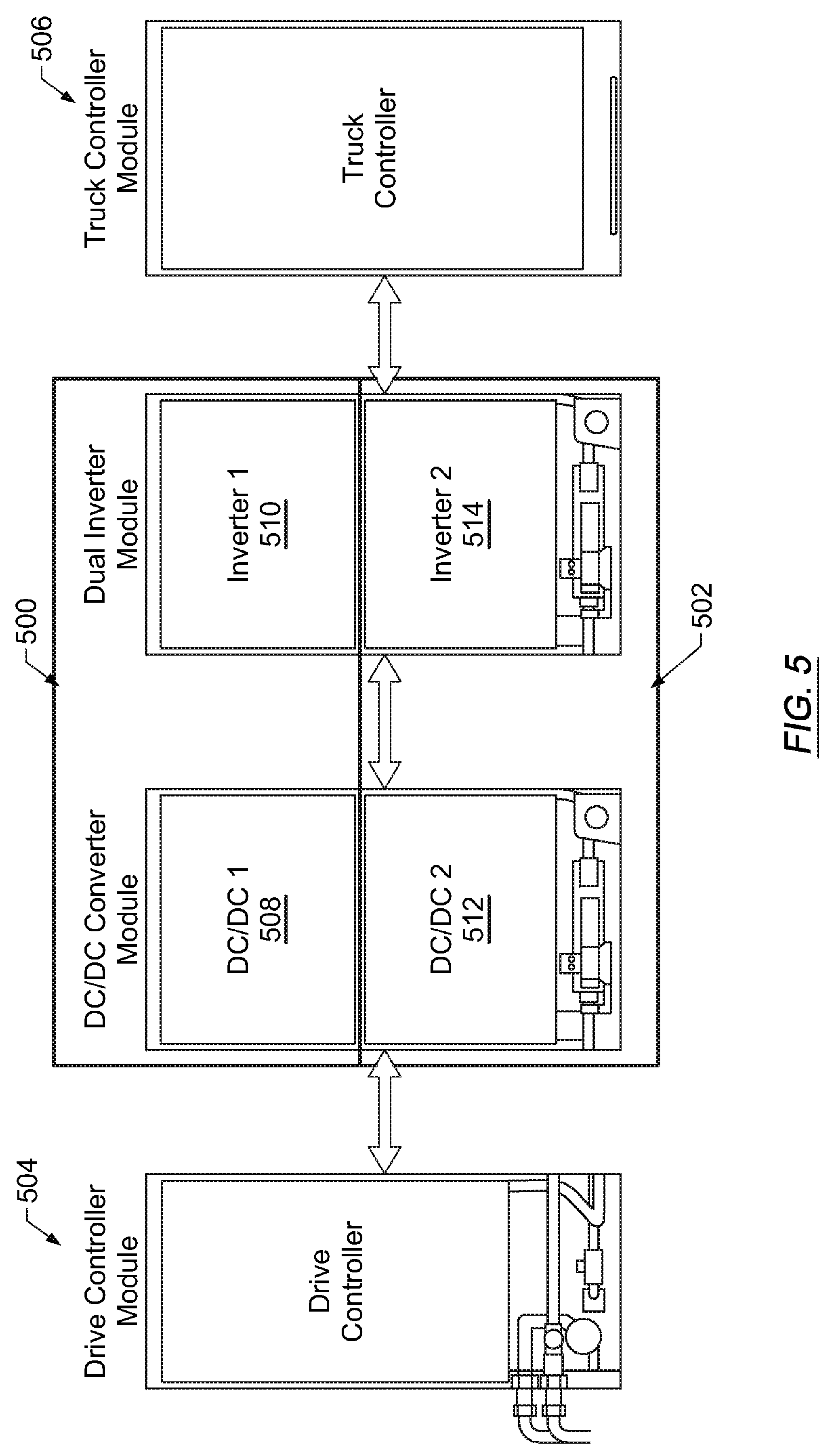

FIG. 5 shows and arrangement of modules for retrofitting a diesel-electric haul truck. Specifically, FIG. 5 shows a dual module arrangement in the form of module cluster 1 (500) and module cluster 2 (502). Each of the dual modules controls one wheel motor of the two-wheel motor arrangement shown in FIG. 2. In addition, FIG. 5 shows a drive controller module (504) and a truck controller module (506).

The module cluster 1 (500) includes DC/DC 1 (508), which is a single module having a switch arrangement that commands the module to behave as a DC/DC converter. The module cluster 1 (500) also includes inverter 1 (510), which is a single module having a switch arrangement that commands the module to behave as an inverter.

The module cluster 2 (502) includes DC/DC 2 (512), which is a single module having a switch arrangement that commands the module to behave as a DC/DC converter. The module cluster 2 (502) also includes inverter 2 (514), which is a single module having a switch arrangement that commands the module to behave as an inverter.

The drive controller module (504) may be one or more of the components in the Section B (406) shown in FIG. 4. The truck controller module (506) may be the truck controller (240) shown in FIG. 2.

If the power needs for the wheel motors exceed the capacity of the module clusters shown in FIG. 5, one or more additional clusters of DC/DC converter modules and inverter modules can be added in parallel to multiply the capacity of the system without impacting other modules. If the voltage specifications for one or more wheel motors exceed the capacity of any set clusters, additional dual inverter modules may be added in series to increase the capacity of the system without impacting other modules. Thus, multiple clusters of modules may be added in parallel or series depending on the voltage and current specifications of a specific haul truck, without impacting other modules or clusters of modules.

Additionally, each module is physically interchangeable with any other module. The function of any given module may be changed by changing an array of switches on the given module.

Thus, the modular system of one or more embodiments allows a base set of components to be added or removed at any time with minimal changes to other modules or the need to replace existing components. Each module can be split, run in parallel, or in series. Multiple modules of the same type can be added to increase the capacity of the system.

The modules of one or more embodiments may operate isolated from the other modules. This arrangement allows further modularity as the individual modules can be operated as a single cluster. This arrangement also increases the reliability of the entire system as the failure of one module does not impact the operation of other modules. The modules also may be swapped between the inverters and DC/DC converters to assume a desired functionality as the mission or configuration of the haul truck changes.

Figure 6:
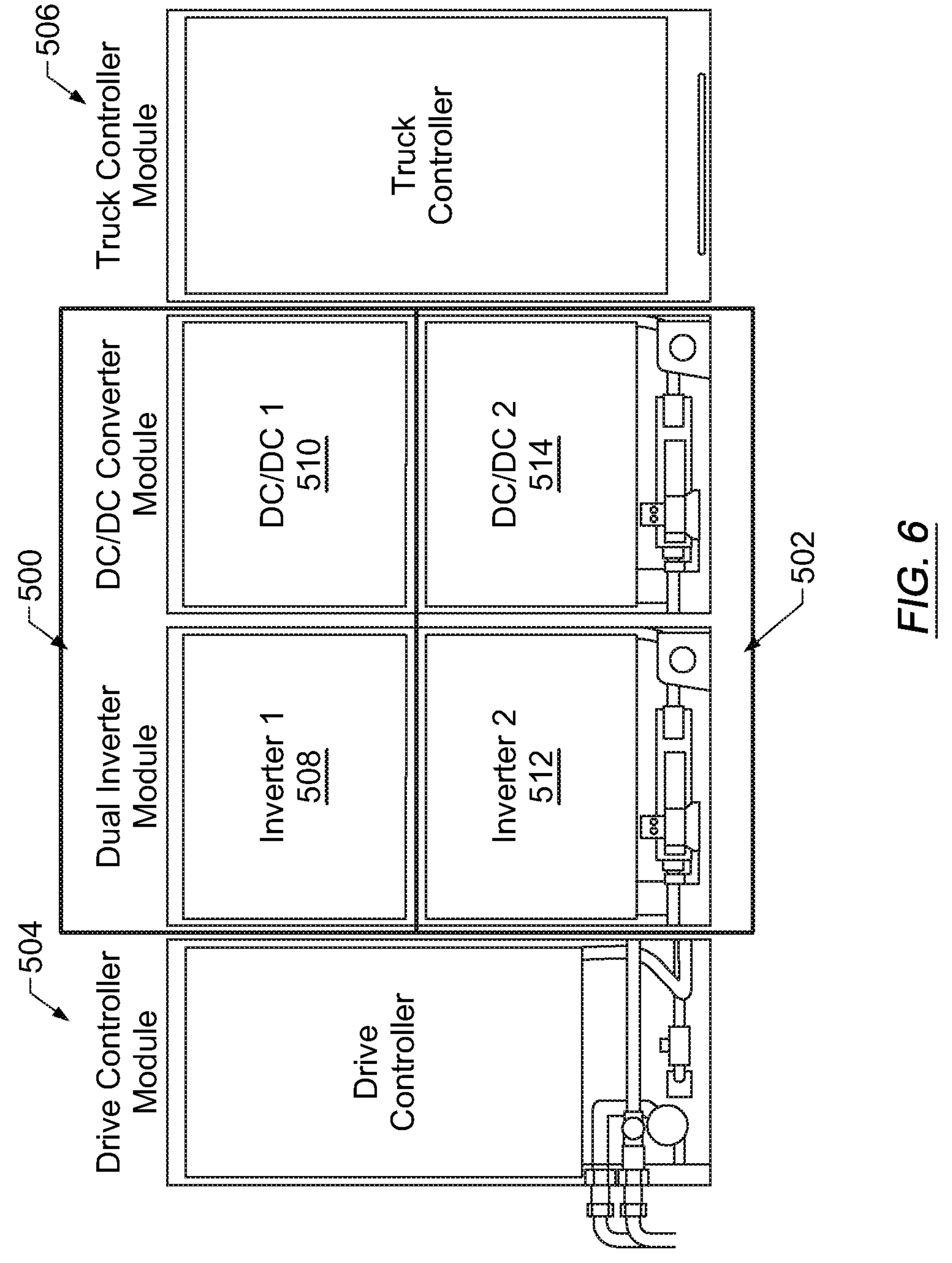

FIG. 6 shows another arrangement of modules. Like FIG. 5, FIG. 6 shows a module cluster 1 (500), a module cluster 2 (502), a drive controller module (504), and a truck controller module (506). However, in FIG. 6, the positions of the inverters and the DC/DC converters have been inverted. This arrangement of modules may better fit a haul truck model that is different than the haul truck model for which the arrangement of modules was generated in FIG. 6. Thus, FIG. 6 shows the versatility of the modular haul truck drive system described herein.

Figure 7:
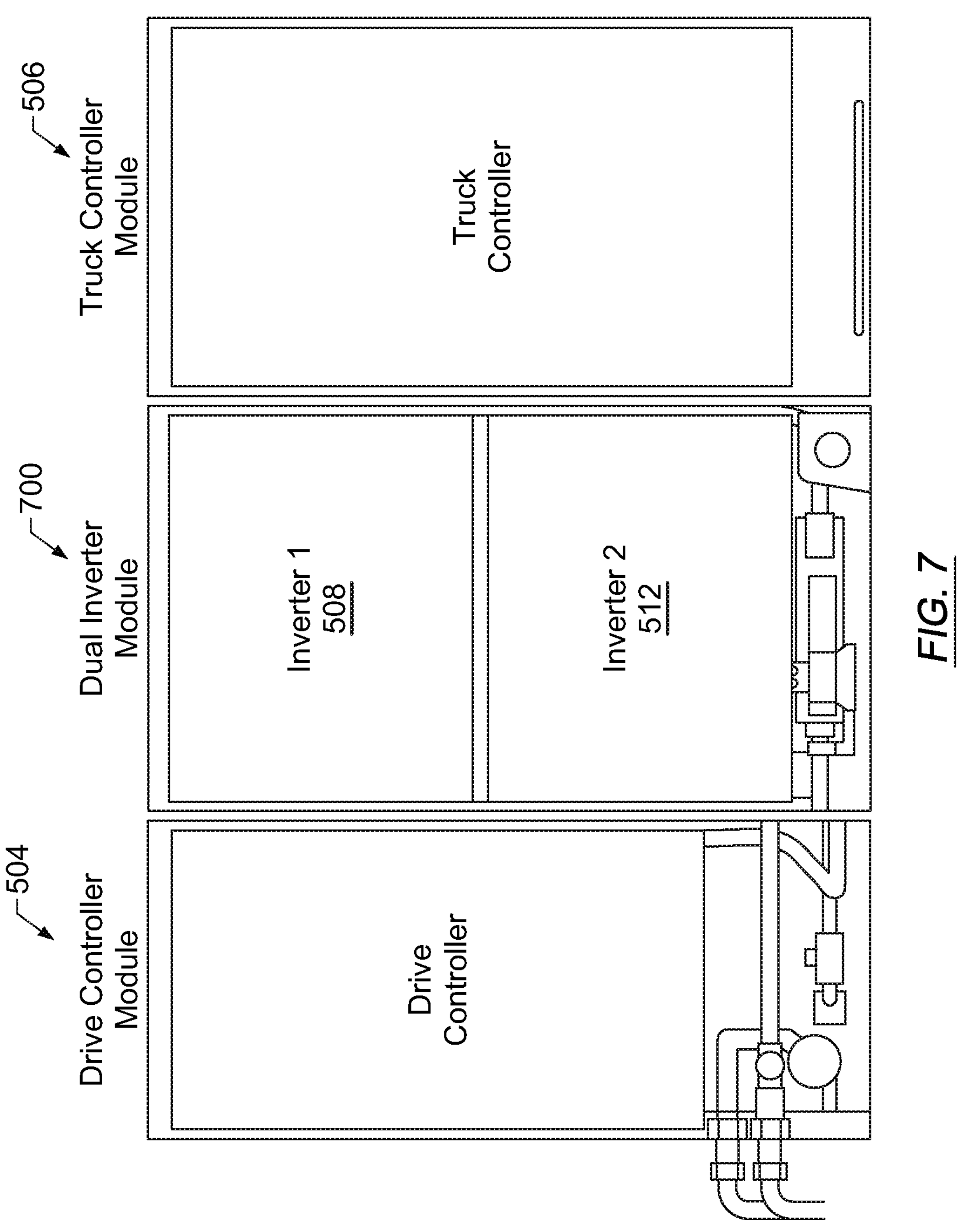

Similarly, FIG. 7 shows still another arrangement of modules. Like FIG. 5 and FIG. 6, FIG. 7 shows a drive controller module (504) and a truck controller module (506). However, for this particular haul truck retrofit, the DC/DC converters were not provided, as being unnecessary. Thus, the module group (700) includes two inverters, the inverter 1 (508) and the inverter 2 (512). Each inverter is connected to a corresponding wheel motor.

Many other arrangements of modules and clusters of modules are possible. Thus, one or more embodiments are not limited to the examples shown herein.

FIG. 8, FIG. 9, FIG. 10, FIG. 11, FIG. 12, FIG. 13, and FIG. 14 show examples of modules, in various arrangements, for a modular drive system in a haul truck, in accordance with one or more embodiments. Each of the arrangements shown in FIG. 8 through FIG. 14 use a single type of module, with multiple modules programmed and arranged to perform different functions, as described with respect to FIG. 2 through FIG. 7. Thus, reference numerals common to FIG. 8 through FIG. 14 refer to similar components having similar functions and definitions.

Figure 10:
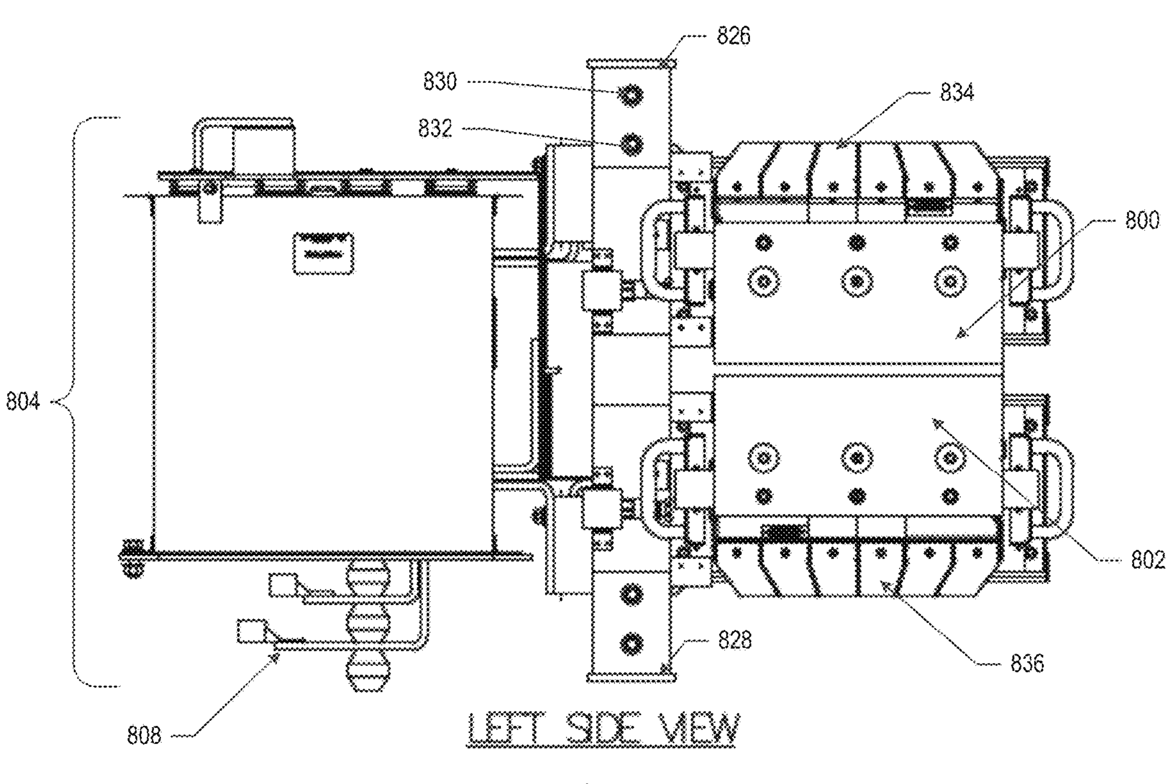
Figure 11:
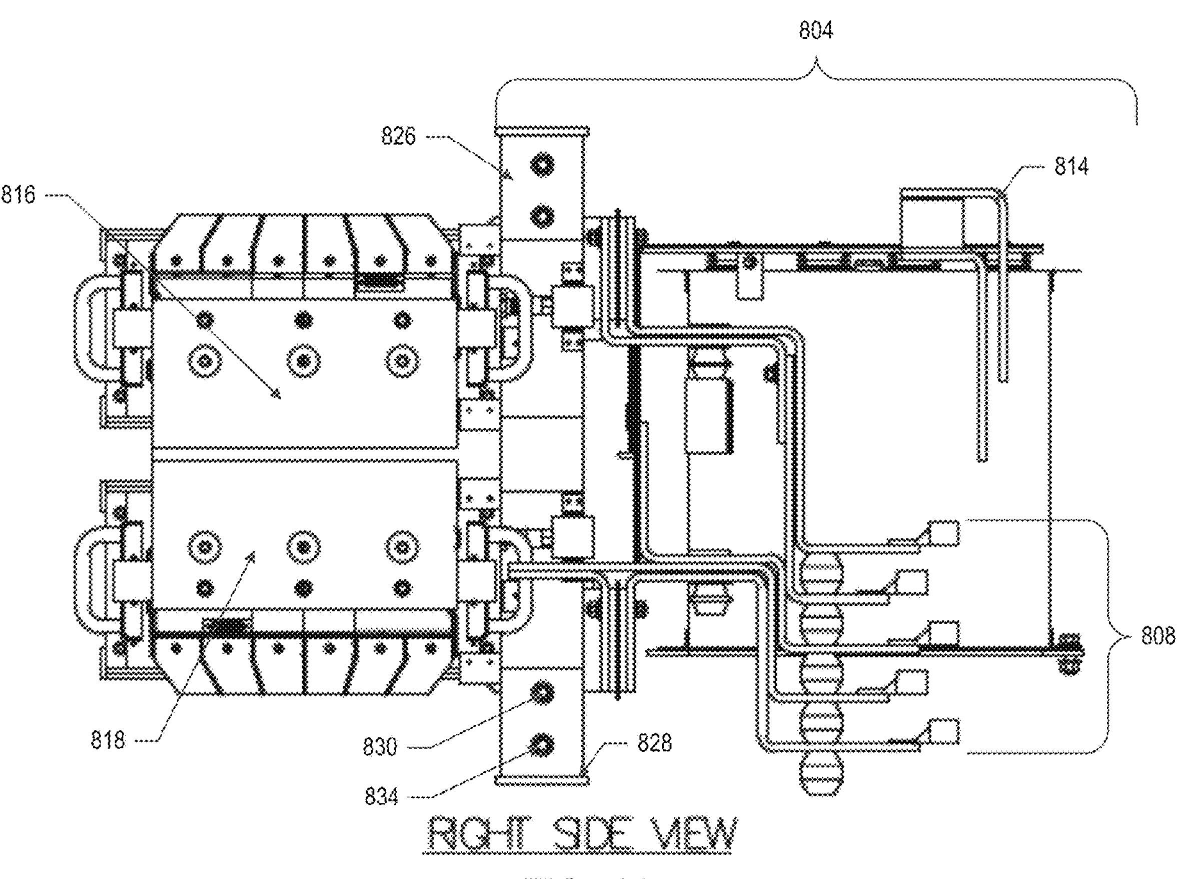
Figure 12:
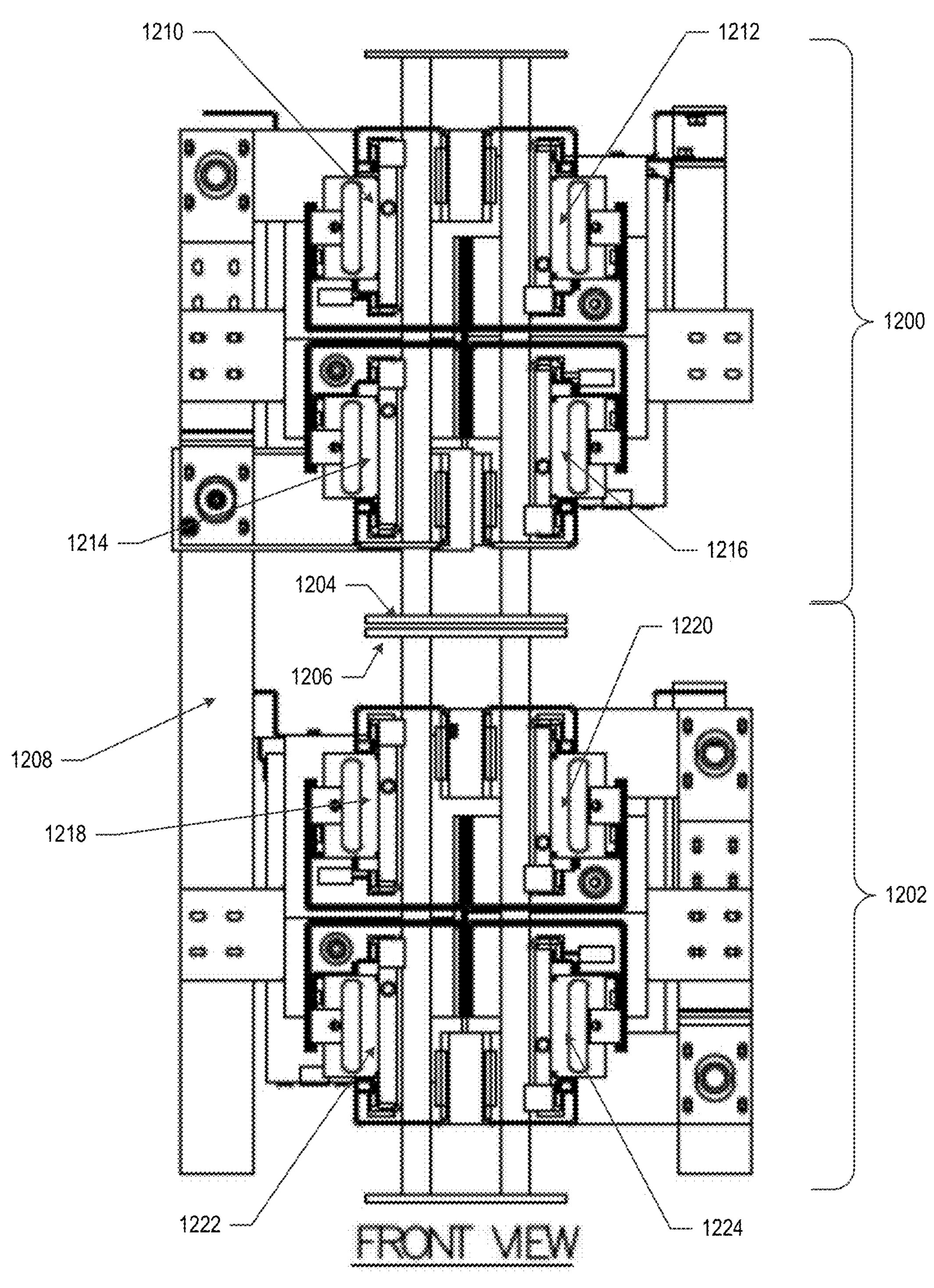
Figures 13, 14:
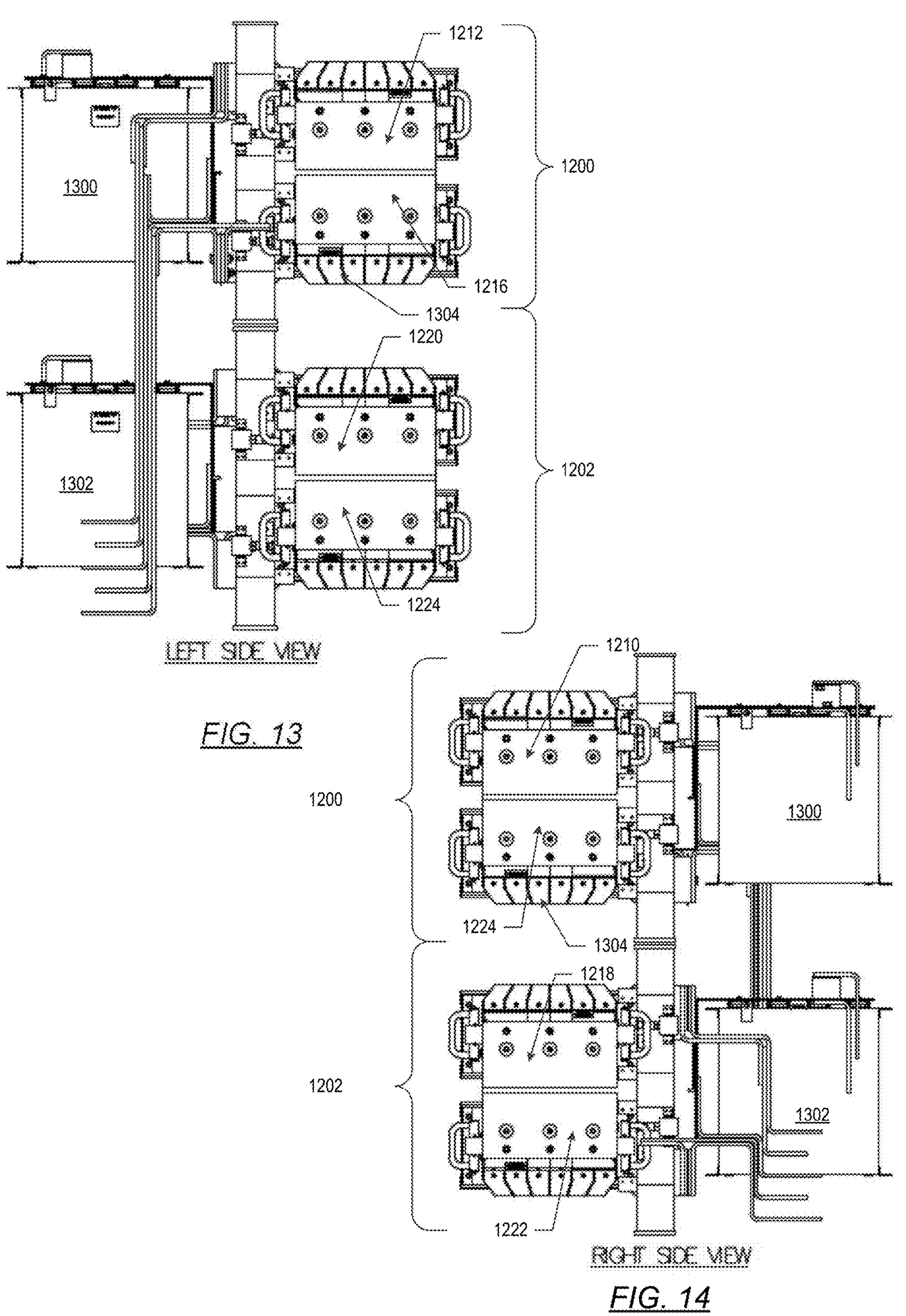

Additionally, two embodiments are shown in FIG. 8 through FIG. 14. The first embodiment is shown in FIG. 8 through FIG. 11. The first embodiment is directed to a group of two power modules (i.e., module (800) and module (802)) connected to a control section (i.e., control section (804)). The second embodiment is shown in FIG. 12 through FIG. 14. The second embodiment is directed to two clusters, where each cluster includes four modules (i.e., cluster 1 (1200) and cluster 2 (1202), where cluster 1 (1200) includes module 1 (1204), module 2 (1206), module 3 (1208), and module 4 (1210), and in turn where cluster 2 (1202) includes module 5 (1212), module 6 (1214), module 7 (1216), and module 8 (1218)). Thus, again, FIG. 8 through FIG. 12 show the versatility of using modules of the one or more embodiments to establish, at least in part, the drive system of a haul truck.

Returning to FIG. 8, a top view of a group of four modules and a control section. However, from the top view, only module (800) and module (802) are visible. The module (800) and the module (802) may be, for example, the two inverters shown in FIG. 7, or may be an inverter and DC/DC converter pair, such as shown in FIG. 5 and FIG. 6. The electrical function configuration of the modules is based on the selection of a set of switches (see FIG. 9) provided on each module.

The modules are connected to a control section (804), which may be the Section B (406) shown in FIG. 4. The control section (804) may be used to provide auxiliary power to various components of the haul truck (hydraulics, etc.). Thus, the control section (804) may permit an operator to shut off the engine and operate the truck using alternative power sources, such as a battery, fuel cell, solar panels, trolley wire or some other power source.

The control section (804) may include a bus connection (806) that electrically connects to the module (802) and the control section (804). The bus connection (806) is connected to an AC bus (808), which in turn is connected to one or more field terminals (810). The control section (804) also may include one or more capacitors, such as capacitor (812). The control section (804) also may include a DC bus (814) for carrying a DC current from the control section (804) to other electrical components of the haul truck (e.g., a wheel motor).

Figures 8, 9:
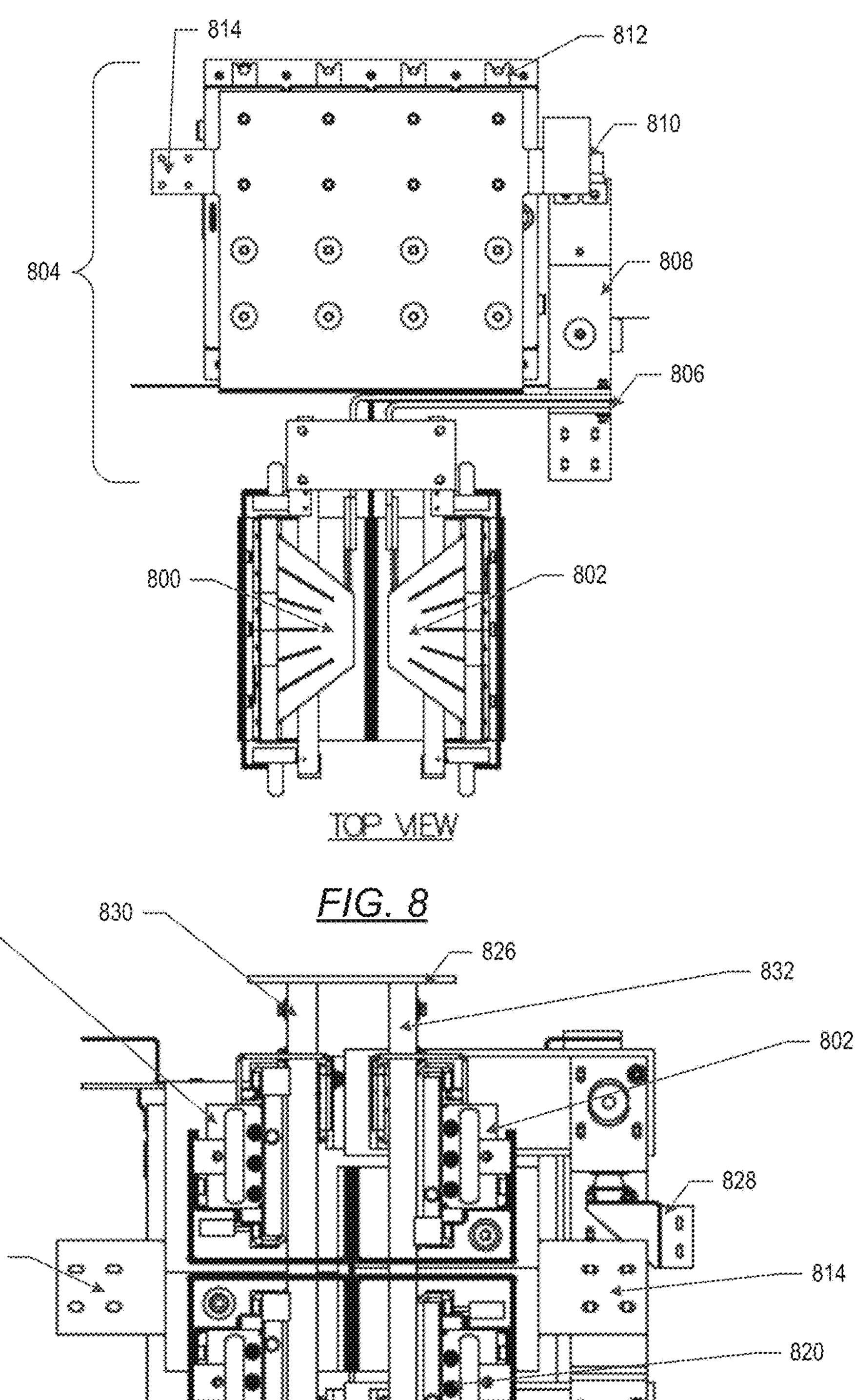
FIG. 8, FIG. 9, FIG. 10, FIG. 11, FIG. 12, FIG. 13, and FIG. 14 show examples modules, in various arrangements, for a modular drive system in a haul truck, in accordance with one or more embodiments.

FIG. 9 shows a front view of the group of modules and control section shown in FIG. 8. The module (800) and the module (802) are shown for reference. Also shown for reference is the DC bus (814). In addition, the other two modules of the set of four modules are visible, specifically module (816) and module (818).

The four modules may be identical in construction. Thus, each of the module (800), module (802), module (816), and module (818) may be interchangeable with each other. The function of the modules change based on the selection of switches (820) shown on each module proximate to a handle (822) shown on each module. For example, in one configuration the switches may cause a module to function as an inverter, in a second configuration the switches may cause a module to function as a rectifier, in a third configuration the switches may cause a module to function as an alternator field static exciters (AFSE), in a fourth configuration the switches may cause the module to function as a DC/DC converter, in a fifth configuration the switches may cause the module to function as an AC/AC converter. Other configurations are possible.

The handles, such as the handle (822), may allow easy access for a human maintenance technician. For example, a module to be maintenance may be removed from the group of modules by pulling on the handle (822) and a replacement module installed into the module group (together with changing the switches to the desired configuration).

The top view of the module group, as shown in FIG. 9, also shows a field terminal (824). The field terminal (824) permits the group of modules to be connected to an external electrical system or to some other electrical component in the haul truck.

The module group may be supported by one or more support structures, such as support structure (826) and support structure (828). The support structures may secure the modules or the control section (804) within a power cabinet (404) disposed on a chassis of the haul truck, or to some other portion of the haul truck.

The group of modules also may be provided with a coolant inlet (830) and a coolant outlet (832). Coolant from a coolant source flows through the coolant inlet (830) through coolant lines that are disposed around or in the modules. The coolant returns through the coolant lines and to the coolant source via the coolant outlet (832).

FIG. 10 shows a left side view of the group of modules and the control section (804). The term "left" is only used to distinguish from the "right side" view shown in FIG. 11. The views may be reversed in some embodiments, thus, "left" and "right" do not imply a specific orientation of the modules and the control section (804). The module (800), the module (802), the control section (804), the AC bus (808), the support structure (826), the support structure (828), the coolant inlet (830), and coolant outlet (832) are shown for reference.

In addition, FIG. 10 shows a bus system for each module. Thus, the module (800) includes bus system (834) and the module (802) includes bus system (836). The bus system (834) and the bus system (836) conduct electrical current through the corresponding module and into the AC or DC terminals of the control section (804). The function of the bus system (836) may depend on the configuration of modules.

FIG. 11 shows a right side view of the modules and the control section (804). Again, the term "right side" refers to the fact that FIG. 11 shows a view that is opposite, relative to an axis of the modules, to the view shown in FIG. 10. The module (816), module (818), control section (804), AC bus (808), DC bus (814), support structure (826), support structure (828), coolant inlet (830), and bus system (834) are shown for reference.

Attention is now turned to FIG. 12 through FIG. 14, which shows another embodiment of groups of modules, together with a control section. Each of the modules shown in FIG. 12 through FIG. 14 are identical in manufacture to the module (800), the module (800), the module (816), and the module (818) shown in FIG. 8 through FIG. 11. However, in FIG. 12 through FIG. 14 two groups of four modules are arranged into two clusters, cluster 1 (1200) and cluster 2 (1202).

Support structure (1204) of the cluster 1 (1200) may connected to the support structure (1206) of the cluster 2 (1202). Electrically, the two clusters may be connected via a DC bus (1208). The coolant lines of the two clusters may connect at the interface between the support structure (1204) and the support structure (1206).

The cluster 1 (1200) includes four modules, including module (1210), module (1212), module (1214), and module (1216). Similarly, the cluster 2 (1202) includes four modules, including module (1218), module (1220), module (1222), and module (1224). Again, the switch arrangement of each module changes the electrical function of a given module. In the example of FIG. 12, the two clusters of modules each operate as a particular function. For example, the switches of the modules in the cluster 1 (1200) cause the modules within the cluster 1 (1200) to operate as a DC/DC converter. Similarly, the switches of the modules in the cluster 2 (1202) cause the modules within the cluster 2 (1202) to operate as an inverter. Thus, the arrangement of modules shown in FIG. 12 may be useful to implement the dual inverter and dual DC/DC converter arrangement shown in FIG. 5.

In general, an inverter may be implemented using three modules. Thus, a four module cluster that has an inverter may be an inverter and a DC/DC converter, or may be an inverter and a braking chopper. A four cluster module may be a single DC/DC transformer with parallel modules, or may be a combination of DC/DC transformers and a braking chopper. Other module arrangements are possible.

FIG. 13 shows a left side view of the two clusters shown in FIG. 12. Similarly, FIG. 14 shows a right side view of the two clusters shown in FIG. 12. Again, the terms "left" and "right" conveniently distinguish the two views, and thus imply only opposite viewpoints of the clusters, relative to an axis of the clusters. The cluster 1 (1200) and the cluster 2 (1202) are shown in each of FIG. 13 and FIG. 14.

FIG. 13 shows the module (1212) and the module (1216) in the cluster 1 (1200). FIG. 13 also shows the module (1220) and the module (1224) in the cluster 2 (1202). Additionally, the bus systems of each of the modules (e.g., bus system 1304) is visible in the side views of FIG. 13.

FIG. 14 shows the module (1210) and the module (1224) in the cluster 1 (1200). FIG. 14 also shows the module (1218) and the module (1222) in the cluster 2 (1202). Additionally, the bus systems of each of the modules (e.g., bus system 1304) is visible in the side views of FIG. 14.

FIG. 15 shows an electrical wiring diagram for a haul truck having a modular drive system, in accordance with one or more embodiments. The electrical wiring diagram shown in FIG. 15 may be implemented using an arrangement of the modules shown in FIG. 8 through FIG. 14.

The electrical wiring diagram of FIG. 15 uses industry standard symbols for electronic components. Thus, for example a diode (1500), a transistor (1502), a resistor (1504), an inductor (1506), and a capacitor (1508) are shown by industry standard symbols for electrical wiring diagrams.

Boxes, as described below, surround groups of electrical components in FIG. 15. Such boxes show the wiring within one module in a group of modules. The wiring within a given box may be arranged by changing the switches in a corresponding module. Certain electrical sources or other components of the haul truck are also shown, such as an engine (1510), alternator (1512), first wheel motor (1514) and second wheel motor (1514).

A first module (1516) (or set of modules) serves as an alternator field static exciters (AFSE). The first module (1516) (or set of modules) is electrically connected to the alternator (1512).

A second module (1518) (or set of modules) serves as a DC/DC converter that transforms the voltage level of the electrical energy flowing from the alternator. The second module (1518) (or set of modules) is electrically connected to a filter (represented by the series of diodes, including the diode (1500)) and to two batteries, in this example.

A third module (1520) (or set of modules) serves as an auxiliary DC/DC converter. The third module (1520) (or set of modules) is electrically connected to the second module (1518).

A fourth module (1522) (or set of modules) serves as a set of braking choppers and resistors. The fourth module (1522) (or set of modules) is electrically connected to the third module (1520).

A fifth module (1524) (or set of modules) serves as a set of traction inverters. The fifth module (1524) (or set of modules) is electrically connected to the fourth module (1522) and to the wheel motors (i.e., the wheel motor (1514) and the wheel motor (1515)).

In addition to the above, the wiring diagram of FIG. 15 includes additional detail sections. For example, section (1526) shows the wiring detail of the third module (1520) (or set of modules) that serves as the auxiliary DC/DC converter. Additionally, section (1528) shows the wiring detail of the first module (1516) that serves as an AFSE.

Figure 16:
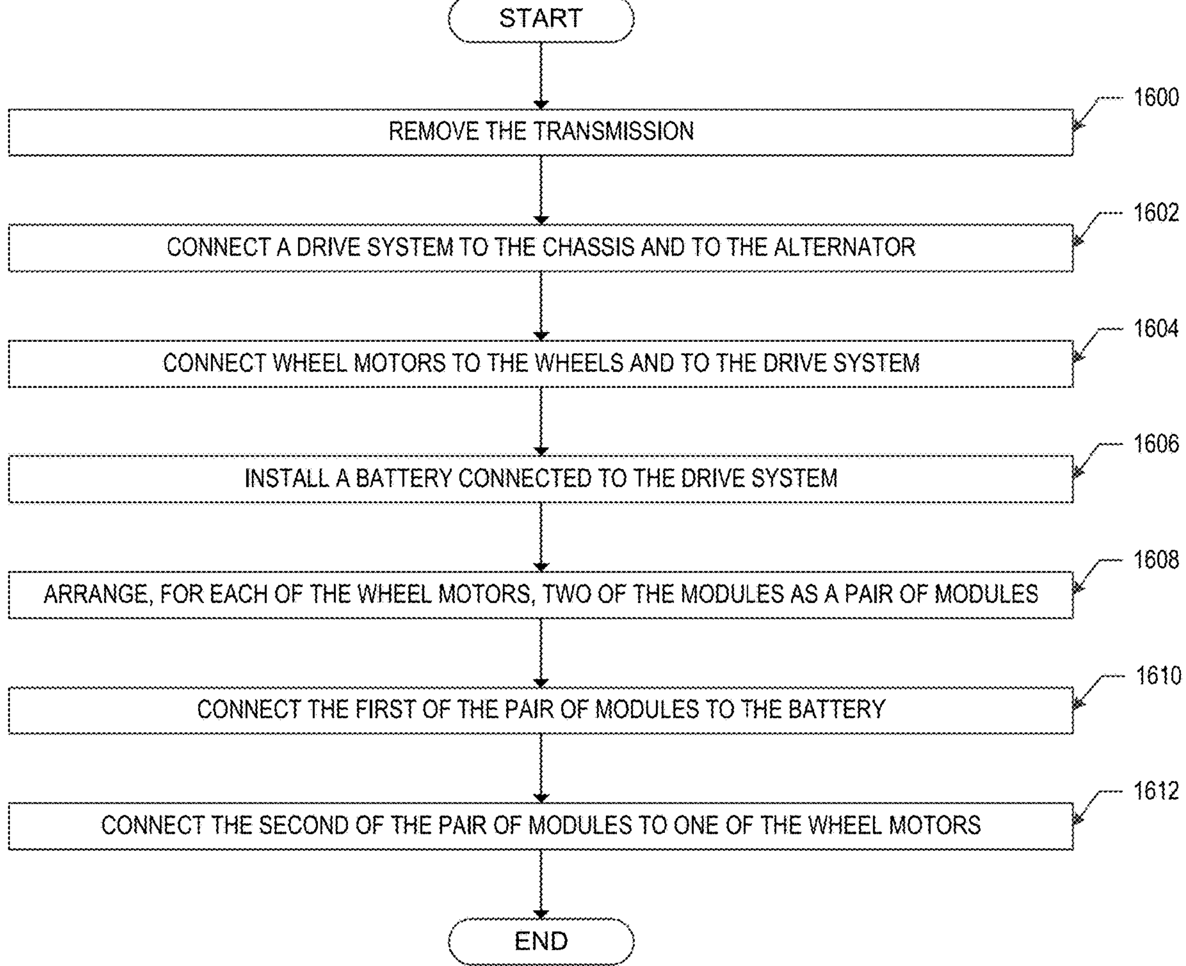
FIG. 16 shows a method of retrofitting a combustion engine vehicle into a vehicle having a modular drive system, in accordance with one or more embodiments.

FIG. 16 shows a method of retrofitting a combustion engine vehicle into a vehicle having a modular drive system, in accordance with one or more embodiments. For example, the method of FIG. 16 may be characterized as a method of retrofitting a vehicle, including a chassis, an engine connected to the chassis, an alternator connected to the engine, a transmission connected to the engine, and a plurality of wheels connected to the chassis. The method shown in FIG. 16 may be implemented using the modules and other components describe with respect to FIG. 2 through FIG. 15. The method of FIG. 16 may be used to retrofit a combustion engine haul truck into a hybrid haul truck.

Step 1600 includes removing the transmission. The transmission may be removed by disconnecting the transmission from the haul truck. Removal of the transmission may also include removal of other components that will no longer be used in the retrofitted haul truck, such as a drive shaft, differential, etc.

Step 1602 includes connecting a drive system to the chassis and to the alternator. Connecting the drive system to the chassis may include installing a power cabinet on the deck of the haul truck. Then, one or more modules may be connected then inserted into the power cabinet, though some of the one or more modules may be located in other locations throughout the haul truck. Connecting the drive system also includes setting switches on the modules to configure the modules to operate in a pre-determined functionality engineered for the truck being retrofitted.

Connecting the drive system also includes connecting the modules to other electrical systems of the haul truck via wires or other components that connect to the appropriate modules in the haul truck. For example, modules configured as inverters may be electrically connected to the wheel motors of the haul truck. Additionally, modules configured as DC/DC converters may be electrically connected to the output of another module configured as an AFSE. In turn, the AFSE may be connected to the alternator of the truck.

Each of the modules may be directly connected to at least one other module. However, as indicated above, some or all of the modules need not be connected to each other. Each of the modules may be interchangeable with another of the modules. Each of the modules includes one or more switches for controlling a mode of operation of each of the modules. One or more switches of each of the modules are set to control an electrical interface between the drive system and electrical components of the vehicle, including at least the wheel motors of the haul truck.

Step 1604 includes connecting a set of wheel motors to the wheels and to the drive system. Each wheel may be connected to one motor. However, particularly when multiple wheels operate in tandem, one motor may be connected to multiple wheels. In some instances, multiple motors may be connected to one wheel.

Connecting the set of wheel motors to the drive system may be accomplished by electrically connecting each of the wheels to one or more modules in the drive system. For example, one of the motors may be connected to one or more modules configured to operate as an inverter. The electrical connection may be made, for example, by a wire that runs from the wheel motor to a connection section of a cluster of modules, and thence to the module configured to operate as an inverter.

In an embodiment, the method of FIG. 16 may end after step 1604. However, the method also may continue.

For example, step 1606 may include installing a battery connected to the drive system. The battery may be connected to the drive system by connecting the battery to the connection section of a module or a cluster of modules. For example, the battery may be connected to a module configured to operate as a DC/DC converter.

In another example, step 1608 may include arranging, for each of the wheel motors, two of the modules as a pair of modules. In this case, a first of the pair of modules has a first switch arrangement such that the first of the pair of modules operates as a direct current voltage converter. A second of the pair of modules has a second switch arrangement such that the second of the pair of modules operates a traction inverter.

Step 1610 includes connecting the first of the pair of modules to the battery. Again, the first pair of modules may be connected to the battery via a connection section of the first pair of modules.

Step 1612 includes connecting the second of the pair of modules to one of the wheel motors. Again, the second pair of modules may be connected to the wheel motors via a connection section of the second pair of modules.

The method of FIG. 16 may be varied. More or fewer steps may be added, or the steps may be performed in a different order.

For example, a specific implementation of the retrofitting method of FIG. 16 is now presented. The example is in the context of a haul truck that, initially, uses solely a diesel engine as a source of power to drive the wheels of the haul truck.

The old traction and control system on the existing truck is removed and replaced with new components. Thus, for example, the drive cabinets, some operator controls, the dashboard displays, dynamic braking module, possibly the rectifier, possibly the alternator, and possibly the traction motors are replaced.

The multi-source power drive system is manufactured in a way that inverters, alternator field controllers, and DC/DC converters can be placed together as multiple units or in combination with other components without a complete redesign of the system. Each item can be placed in series or parallel depending on the power needs of the specific truck system. The replacement kit is designed such that additional space can be gained by connecting a standard volume of space for housing the components. The interface between the components is designed such that any individual component can be added as a single item and fit in a predefined space without having to custom manufacture each variant. This modularity allows high flexibility in what drive pieces are used for each truck application and eases manufacturing.

The multi-source retrofit power system could be extended with autonomous features. For example, the multi-source power system could include technologies such as object detection, braking assist, driver alert assist, operation using a centralized control center, or fully autonomous operation. Smaller capacity, yet easier to fully power by battery, trucks could become retrofitted or built using one or more embodiments.

One or more embodiments also provide for trucks with wheels that are powered by motors built into the wheels containing integrated drive packages. Other variations are possible.

The following additional example is provided, and should not be considered to limit one or more embodiments. A mine operator operates fifty KOMATSU® 930E-2 Trucks®, twenty-five CATERPILLAR® 793® (CAT 793®) trucks, and has a greenhouse gas reduction initiative of 30% by 2030. Other equipment manufacturers do not offer emission reduction systems for older generation trucks to meet this time frame. The current solution would be to scrap the twenty-five CAT 793® trucks and the fifty KOMATSU 930E-2® trucks and purchase 75 new KOMATSU 930E-5® trucks with some sort of other equipment manufacturer emission reduction system. If other manufacturer trucks are later added to the fleet from another location, they may not utilize the same emission reduction system and would be incompatible.

The multi-source power system of one or more embodiments allow the mine operator to use the systems and components of FIG. 1 through FIG. 15 and the method of FIG. 16 to upgrade the KOMATSU 930E-2® trucks and CAT 793® trucks with emission reduction technology for less than the cost of replacement trucks, while also allowing the mine operator to claim greenhouse gas reduction by re-using the materials in their existing trucks. The mine operator would have a standardized system on all their trucks that eases spare parts, training, maintenance, and supports the same emission reduction technologies.

Any later trucks added to the fleet may be retrofitted with the same system or similar system to allow compatibility with the existing emission reduction technologies. The ability to apply the retrofit kit of one or more embodiments to haul trucks purchased in the future is possible due to the modular and flexible design of the retrofit system.

For example, the CAT 793® retrofit may use a single inverter, a single motor, no alternator, no grid resistor, and a battery. The unnecessary sections of the standard drive cabinet may be removed without any redesigns, leaving a smaller system footprint and lower cost. The flexible I/O of the system controller allows modules to be added to interface to the CAT® transmission and engine without any major changes to the controller.

In the specific, non-limiting, example, the KOMATSU 930E® requires two inverters, an alternator field controller, a grid resistor, a grid resistor blower inverter, and no battery. The flexible I/O of the system controller allows modules to be added to interface to the KOMATSU® engine, alternator, and operator controls. The extra sections of the drive cabinet that are required for the KOMATSU 930E®, compared to the CAT 793®, are added without any redesigns in order to provide the extra features of the KOMATSU 930E®.

In an embodiment, a battery may be used to reduce emissions on the KOMATSU 930E®. The battery may be added along with a DC/DC cabinet section, without replacing any other sections of the drive system. As battery technology matures to the point where one or more batteries can adequately power the entire truck, the retrofit kit of one or more embodiments permit the engine, alternator, and alternator field controller sections of the drive system to be removed from the KOMATSU 930E® without requiring any new equipment or redesigns. The system controller is reconfigured to control power flow from the battery and DC/DC without any hardware changes. Glass dash displays are reconfigured to show the status of the new components. The engine, alternator, and supporting systems may then be completely removed from the KOMATSU 930E® without impacting the drive system or requiring any new equipment.

In an embodiment, a hydrogen fuel cell may be used to reduce emissions on the KOMATSU 930E®. The fuel cell may be added along with a DC/DC cabinet section and battery, without replacing any other sections of the drive system. The retrofit kit of one or more embodiments permits the engine, alternator, and alternator field controller sections of the drive system to be removed from the KOMATSU 930E® without requiring any new equipment or redesigns. The system controller is reconfigured to control power flow from the fuel cell, DC/DC, and battery without any hardware changes. Glass dash displays are reconfigured to show the status of the new components. The engine, alternator, and supporting systems may then be completely removed from the KOMATSU 930E® without impacting the drive system or requiring any new equipment.

While the various steps in the flowchart of FIG. 16 are presented and described sequentially, at least some of the steps may be executed in different orders, may be combined or omitted, and some of the steps may be performed in parallel. Furthermore, the steps may be performed actively or passively.

A summary of one or more embodiments is now presented. From the above, the drive system of one or more embodiments includes a design modularity that is unique in that the design may handle the large amount of power that the haul truck drivetrain uses to carry large loads (relative to smaller trucks). The system of one or more embodiments is also designed to minimize the structural changes to the haul truck when being retrofitted on an existing haul truck, to operate continuously in harsh conditions, to be serviced in the field for minimal downtime, and to provide for compatibility with trucks from multiple manufacturers and of multiple sizes.

The system includes components used to provide a working drop-in solution for haul trucks. Such components include a liquid cooling thermal management system and a reconfigurable system controller to control power flow between various emissions control items, truck power sources, and the drive system. Touch screen operator displays may be included that can be used to reconfigure the system when system components are added or removed during a haul truck retrofit.

The multi-source retrofit power system includes one or more combinations of high power motor drive(s), a DC/DC converter, an alternator field excitor, an alternator, traction motors, a grid blower inverter, a dynamic braking module with blower, a system controller, operator controls, and a glass touch screen dashboard. The power electronic modules used in the inverter and DC/DC are modular and can be configured in multiple ways based on the design parameters for a higher expected maximum current load or higher expected maximum voltage load.

The system controller is used to send commands to the drive system based on operator input, motor speed, motor temperature, engine communication, transmission communication, wheel speed, truck inclination, and/or internal measurement (IMU) units. An IMU is a device that includes a combination of an accelerometer, a compass, and a gyroscope. The system controller also sends commands to the engine based on operator input and displays system status to the operator using touchscreen glass dash displays. Communication to the various system components happens via J1939/Canbus, high speed ethernet, analog signals, or digital signals. The drive system modularity may be extended to the system controller that allows for flexible inputs and outputs to match the varying control interfaces on different manufacturer trucks. The system controller utilizes one or more algorithms to control power flow between the various emissions control items, truck power sources, and the drive system.

A drive system cabinet disposed in a human-reachable area of the haul truck may provide ease of access, relative to existing haul truck access, and safety, relative to existing haul truck systems. For example, high voltage areas may be isolated and locked from access. Field wiring and electronics may be behind hinged cabinet doors that can also be locked. A maintenance interface may be available in the system controller section to allow access to data logging, trends, and system analytics. Wireless network connectivity may be included to allow remote monitoring, configuration, and cloud-based reporting for a fleet of haul trucks.

A useful feature of one or more embodiments is that the multi-source power system may be a retrofit kit for other equipment manufacturer trucks, whether diesel-electric or mechanical diesel. Many fleets have older trucks that are mechanically sound but are powered by obsolete and unsupported drive systems. Such operators also may have older trucks that are powered by older drive systems that do not support newer emission reduction technologies.

The system of one or more embodiments allows the end user of the haul trucks to upgrade their drive systems to newer technologies without requiring the financial investment and carbon footprint associated with completely new trucks. The upgrade entails the simple replacement of the existing drive cabinet, grid resistor, and dashboard gauges with the multi-source retrofit system described herein. This retrofit kit may provide a single base system for all trucks in the fleet. A single base system simplifies spare parts inventory, training, maintenance, and allows future emissions control systems that can be implemented fleet wide.

The major mechanical components of the truck can be maintained and retrofitted with the propulsion components of one or more embodiments. This design feature of one or more embodiments allows the large, manufacturing intensive components of a truck to be reused.

The system may use hardware, software, and driver interfaces that allow an entire fleet to have the same maintenance, operator interface, and spare parts regardless of truck type or other equipment manufacturer. The system may integrate standard components with kit components of one or more embodiments in order to create a base system that can be modularly assembled into a relevant system for a specific haul truck retrofit operation.

While the figures show a configuration of components, other configurations may be used without departing from the scope of one or more embodiments. For example, various components may be combined to create a single component. As another example, the functionality performed by a single component may be performed by two or more components.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For example, two angles may be "about congruent" if the values of the two angles are within a first predetermined range of angles for one embodiment, but also may be "about congruent" if the values of the two angles are within a second predetermined range of angles for another embodiment. The ordinary artisan is capable of assessing what is an acceptable engineering tolerance for a particular product, and thus is capable of assessing how to determine the variance of measurement contemplated by the term "about."

As used herein, the term "connected to" contemplates at least two meanings, unless stated otherwise. In a first meaning, "connected to" means that component A was, at least at some point, separate from component B, but then was later joined to component B in either a fixed or a removably attached arrangement. In a second meaning, "connected to" means that component A could have been integrally formed with component B. Thus, for example, a bottom of a pan is "connected to" a wall of the pan. The term "connected to" may be interpreted as the bottom and the wall being separate components that are snapped together, welded, or are otherwise fixedly or removably attached to each other. However, the bottom and the wall may be deemed "connected" when formed contiguously together as a monocoque body.

In addition, the term "directly connected to" means that component A and component B are connected immediately adjacent to each other. For example, component A and component B may share a common point of contact in at least one area of both components. However, the common point of contact may be a connector (e.g., a bolt, a screw, etc.), in which case it is possible that component A is "directly connected to" component B without a direct contact between the surfaces of component A and component B. However, in any case, if component A and component B are "directly connected to" each other, then no intervening parts, other than possibly a connector, exist between component A and component B.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of hybrid haul trucks. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of one or more embodiments. However, it will be apparent to one of ordinary skill in the art that one or more embodiments may be practiced without these specific details. In other instances, well-known features have not been described in detail to avoid unnecessarily complicating the description. Further, other embodiments not explicitly described above can be devised which do not depart from the scope of one or more embodiments as disclosed herein. Accordingly, the scope of one or more embodiments should be limited only by the attached claims.

What is claimed is:

1. A vehicle comprising:

a chassis;

an engine connected to the chassis;

an alternator connected to the engine;

a drive system connected to the alternator;

a plurality of wheel motors connected to the drive system; and a plurality of wheels connected to the plurality of wheel motors, wherein the drive system comprises:

a plurality of modules, wherein each of the plurality of modules is directly connected to at least one other module of the plurality of modules, wherein each of the plurality of modules is interchangeable with another of the plurality of modules, wherein each of the plurality of modules includes one or more switches for controlling a mode of operation of each of the plurality of modules, and wherein the one or more switches of each of the plurality of modules are set to control an electrical interface between the drive system and a plurality of electrical components of the vehicle, the plurality of electrical components including at least the plurality of wheel motors.

2. The vehicle of claim 1, wherein the plurality of modules are arranged into a plurality of clusters of modules, wherein each of the plurality of clusters of modules comprises at least two of the plurality of modules.

3. The vehicle of claim 1, wherein each of the plurality of modules is identical to others of the plurality of modules, and wherein an arrangement of the one or more switches of the each of the plurality of modules changes an electrical function of the each of the plurality of modules.

4. The vehicle of claim 1, wherein the drive system further comprises:

a rectifier connected to the plurality of modules;

a grid braking resistor connected to the plurality of modules; and a blower connected to the grid braking resistor.

5. The vehicle of claim 1, wherein at least one of the plurality of modules comprises an inverter, and wherein the drive system further comprises:

an alternator field static exciter connected to the inverter and to the alternator, wherein the alternator field static exciter is configured to control electrical power flowing to the inverter from the alternator.

6. The vehicle of claim 1, wherein at least one of the plurality of modules comprises a grid blower inverter, and wherein the drive system comprises:

a blower connected to the grid blower inverter; and a plurality of grid braking resistors connected to the blower.

7. The vehicle of claim 1, further comprising:

a coolant source connected to the chassis; and a coolant pump connected to the coolant source and to the plurality of modules, wherein the coolant pump is configured to pump coolant from the coolant source to the plurality of modules.

8. The vehicle of claim 1, further comprising:

a battery connected to the chassis, wherein a first module of the plurality of modules has a first switch arrangement such that the first module functions as a direct current voltage converter, the first module connected to the battery, and wherein a second module of the plurality of modules has a second switch arrangement such that the second module functions as a traction inverter, the second module connected to the first module and to a wheel motor of the plurality of wheel motors.

9. The vehicle of claim 8, further comprising:

a braking resistor connected to the second module.

10. The vehicle of claim 8, further comprising:

a second battery connected to the chassis, wherein a third module of the plurality of modules has the first switch arrangement such that the third module functions as a second direct current voltage converter, the third module connected to the second battery, wherein a fourth module of the plurality of modules has the second switch arrangement such that the fourth module functions as a second traction inverter, the fourth module connected to the third module and to a second wheel motor of the plurality of wheel motors, and wherein the fourth module is further connected to the second module.

11. The vehicle of claim 10, further comprising:

a second braking resistor connected to the fourth module.

12. The vehicle of claim 10, further comprising:

a trolley pantograph connected to the chassis, wherein a fifth module of the plurality of modules has the first switch arrangement such that the fifth module functions as a third direct current voltage converter, wherein the fifth module is connected to the trolley pantograph, to the second module, and to the fourth module.

13. The vehicle of claim 1, wherein the plurality of modules comprises:

a first module having a first configuration of switches such that the first module functions as a first direct current voltage converter module;

a second module having the first configuration of switches such that the second module functions as a second direct current voltage converter module;

a third module having a second configuration of switches such that the third module functions as a first inverter module; and a fourth module having the second configuration of switches such that the fourth module functions as a second inverter module, wherein the first module and the second module are arranged as a first pair, wherein the third module and the second module are arranged as a second pair, wherein the first module is connected to the third module and the second module is connected to the fourth module.

14. The vehicle of claim 13, wherein the first module and the third module are connected to a controller.

15. The vehicle of claim 13, wherein the second module and the fourth module are connected to a controller.

16. The vehicle of claim 13, wherein the first module and the second module are configured as traction inverters, and wherein the traction inverters are connected to the plurality of wheel motors and to a plurality of braking resistors that are connected to the plurality of wheel motors.

17. The vehicle of claim 1, wherein the plurality of modules comprises:

a first module having a first configuration of switches such that the first module functions as a first inverter, the first module connected to a controller; and a second module having the first configuration of switches such that the second module functions as a second inverter, the second module connected to the controller.

18. The vehicle of claim 1, wherein the vehicle comprises a haul truck.

19. A method of retrofitting a vehicle comprising a chassis, an engine connected to the chassis, an alternator connected to the engine, a transmission connected to the engine, and a plurality of wheels connected to the chassis, the method comprising:

removing the transmission;

connecting a drive system to the chassis and to the alternator; and connecting a plurality of wheel motors to the plurality of wheels and to the drive system, wherein the drive system comprises:

a plurality of modules, wherein each of the plurality of modules is directly connected to at least one other module of the plurality of modules, wherein each of the plurality of modules is interchangeable with another of the plurality of modules, wherein each of the plurality of modules includes one or more switches for controlling a mode of operation of each of the plurality of modules, and wherein the one or more switches of each of the plurality of modules are set to control an electrical interface between the drive system and a plurality of electrical components of the vehicle, the plurality of electrical components including at least the plurality of wheel motors.

20. The method of claim 19, further comprising:

installing a battery connected to the drive system.

21. The method of claim 20, further comprising:

arranging, for each of the plurality of wheel motors, two of the plurality of modules as a pair of modules, wherein a first of the pair of modules comprises a first switch arrangement such that the first of the pair of modules comprises a direct current voltage converter, and wherein a second of the pair of modules comprises a second switch arrangement such that the second of the pair of modules comprises a traction inverter;

connecting the first of the pair of modules to the battery; and connecting the second of the pair of modules to one of the plurality of wheel motors.

* * * * *